United States Patent
Kokami

(10) Patent No.: US 7,280,308 B2
(45) Date of Patent: Oct. 9, 2007

(54) MOTOR DRIVE SEMICONDUCTOR INTEGRATED CIRCUIT AND MAGNETIC DISK STORAGE APPARATUS

(75) Inventor: Yasuhiko Kokami, Takasaki (JP)

(73) Assignee: Renesas Technology Corporation, Tokyo (JP)

(*) Notice: Subject to any disclaimer, the term of this patent is extended or adjusted under 35 U.S.C. 154(b) by 0 days.

(21) Appl. No.: 11/098,644

(22) Filed: Apr. 5, 2005

(65) Prior Publication Data

US 2005/0218853 A1    Oct. 6, 2005

(30) Foreign Application Priority Data

Apr. 6, 2004    (JP)    ............... 2004-111817

(51) Int. Cl.
*G11B 5/596* (2006.01)

(52) U.S. Cl. .................. 360/78.04; 360/78.06; 360/77.02

(58) Field of Classification Search .............. None
See application file for complete search history.

(56) References Cited

U.S. PATENT DOCUMENTS

| | | | |
|---|---|---|---|
| 5,781,362 A * | 7/1998 | Bang ................ | 360/78.05 |
| 5,838,515 A * | 11/1998 | Mortazavi et al. ....... | 360/78.12 |
| 6,040,674 A * | 3/2000 | Nishida et al. ........... | 318/632 |
| 7,034,490 B2 * | 4/2006 | Sawtell et al. ............ | 318/569 |
| 2003/0021057 A1 * | 1/2003 | Hill ........................ | 360/77.02 |
| 2003/0065469 A1 * | 4/2003 | Pedrazzini et al. ........ | 702/107 |

FOREIGN PATENT DOCUMENTS

| JP | 10 191678 | 7/1998 |
|---|---|---|
| JP | 2002 184137 | 6/2002 |

* cited by examiner

*Primary Examiner*—Andrew L. Sniezek
(74) *Attorney, Agent, or Firm*—Mattingly, Stanger, Malur & Brundidge, P.C.

(57) ABSTRACT

The Invention provides a motor drive semiconductor integrated circuit for driving and controlling a voice coil motor that can conduct a seek operation, a track follow operation and a settling operation through PWM control, has desired control accuracy and can be produced by a CMOS process. In a voice coil motor drive circuit (200) for executing positioning control of a magnetic head by feedback-controlling a driving current of a voice coil motor (108) for moving a magnetic head (106) over a magnetic disk for reading information from a storage track on the magnetic disk driven for rotation while a read state of the magnetic head is being monitored, head movement control such as a seek operation, a track follow operation etc, of the magnetic head is executed by PWM driving on the basis of a command value from a controller.

20 Claims, 20 Drawing Sheets

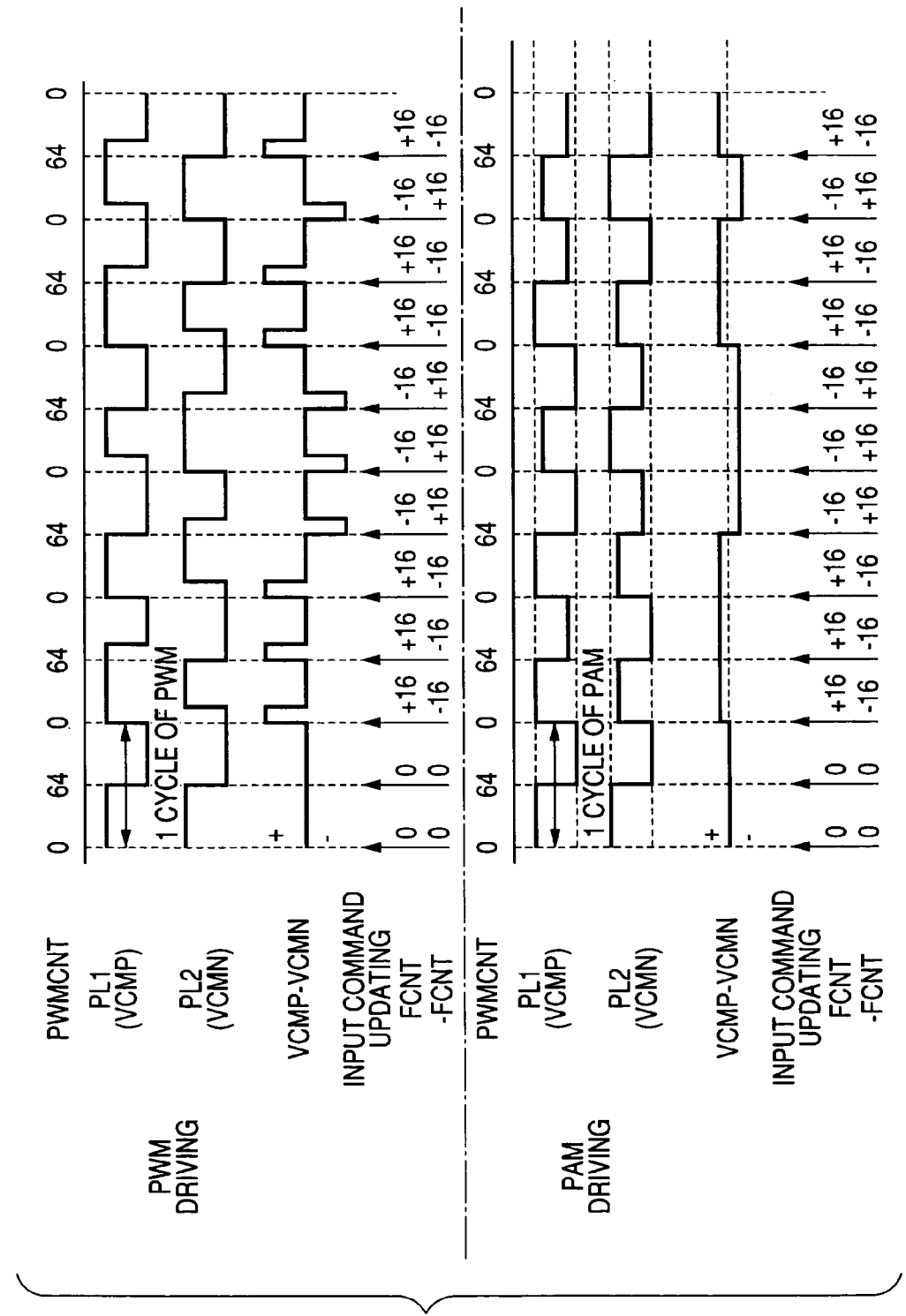

MOTOR DRIVE SEMICONDUCTOR INTEGRATED CIRCUIT AND MAGNETIC DISK STORAGE APPARATUS

CROSS-REFERENCE TO RELATED APPLICATION

The present application claims priority from Japanese patent application No. 2004-111817 filed on Apr. 6, 2004, the content of which is hereby incorporated by reference into this application.

BACKGROUND OF THE INVENTION

1. Field of the Invention

This invention relates to a control technology of a magnetic disk storage apparatus and further to a control technology of a voice coil motor for moving a magnetic head for conducting read/write of information from and to a storage track on a magnetic storage disk that is driven and rotated.

2. Description of the Related Art

A magnetic disk storage apparatus includes a magnetic head for executing read/write of information to and from a storage track on a magnetic storage disk driven and rotated, a voice coil motor for moving the magnetic head on the disk and a voice coil motor drive control apparatus for conducting positioning control of the magnetic head by controlling a driving current of a voice coil motor while a read state of the magnetic head is being monitored.

An information recording density of the magnetic disk storage apparatus has become higher and higher every year and higher accuracy has been required for positioning control of the magnetic head with the increase of the storage density. Therefore, feedback control that executes feedback control of a driving current of the voice coil motor on the basis of a detection value of the driving current and conducts positioning of the magnetic head has been employed. To drive the voice coil motor for moving the magnetic head, a linear driving system for continuously changing a driving current amount of the voice coil motor was employed at the beginning.

The time necessary for moving the magnetic head to a desired storage track, that is, a so-called "seek time", must be shortened to accomplish a higher speed operation of the magnetic disk storage apparatus but the driving current of the voice coil motor must be increased to accomplish this object. When the driving current of the voice coil motor is increased, however, a power loss increases particularly in the motor coil and a calorific value increases with the power loss. The increase of a power source current resulting from the reduction of the seek time is remarkable in the linear driving system. On the other hand, pulse width modulation control (hereinafter called "PWM control") is known as a method of reducing the power source required for moving the magnetic head. This PWM control needs lower power consumption than the linear driving system but is not free from the problem that precision control is difficult to practice.

To cope with the problem, a technology has been developed that drives the voice coil motor by PWM control during the so-called "seek operation" in which the magnetic head is moved to a predetermined storage track and drives the voice coil motor by the linear driving system during a track follow operation in which the magnetic head is allowed to follow the desired track for read/write (refer to patent document 1).

Patent document 1: JP-A-2002-184137

SUMMARY OF THE INVENTION

In the system that switches PWM driving to linear driving at the shift of the seek operation to the track follow operation, however, switching must be conducted smoothly and quickly but precision switching control is difficult. Because a control circuit for PWM driving and a control circuit for linear driving must be designed separately and optimally, a design load becomes great and the circuit scale increases. Therefore, the inventors of the invention have examined to conduct both seek operation and track follow operation through PWM control.

To execute PWM control of the voice coil motor, a D/A conversion circuit of about 14 bits is used at present but a D/A conversion circuit having 16 or more bits is necessary for executing the track follow operation by PWM control. Nonetheless, it is relatively difficult to fabricate the D/A conversion circuit having 16 or more bits by a CMOS process that is predominant in existing semiconductor fabrication technologies. A system that detects a voltage occurring across both ends of a resistor connected in series with a coil has generally been employed in the past as a current detection system for the feedback control of the voice coil motor but it has been clarified that this system involves various problems such as a voltage loss in the sense resistor and a detection error resulting from jitter of a sampling clock.

It is therefore an object of the invention to provide a motor drive semiconductor integrated circuit of a voice coil motor that can conduct both seek operation and track follow operation through PWM control, has desired control accuracy and can be fabricated by a CMOS process.

It is another object of the invention to provide a motor drive semiconductor integrated circuit of a voice coil motor that can make high precision current detection for feedback control of the voice coil motor without being affected by jitter of a sampling clock and without depending on a PWM cycle.

It is another object of the invention to provide a motor drive semiconductor integrated circuit of a voice coil motor that can constitute the whole control system into a digital circuit while suppressing a quantization noise and can consequently improve an S/N ratio in comparison with an analog circuit.

It is still another object of the invention to provide a motor drive semiconductor integrated circuit of a voice coil motor that can execute a seek operation and a track follow operation by PWM control, can reduce a noise occurring in PWM drive and can high correctly control a current.

It is still another object of the invention to provide a motor drive semiconductor integrated circuit of a voice coil motor that can automatically regulate variance of a propagation delay time and a transition time occurring in a driver circuit due to variance of production, can prevent the drop of control accuracy of PWM driving and can prevent the occurrence of an error of positional information and storage information as a noise couples with a signal read by a head due to the change of an output signal of the driver circuit.

It is still another object of the invention to provide a motor drive semiconductor integrated circuit of a voice coil motor that can reduce a power loss occurring in a sense resistor.

It is still another object of the invention to provide a motor drive semiconductor integrated circuit of a voice coil motor that can reduce an error current of a coil resulting from fluctuation of a power source voltage and can execute high precision driving control.

It is still another object of the invention to provide a magnetic disk storage apparatus that that has small power consumption and a small read error.

The above and other objects and features of the invention will become more apparent from the following description of the specification when taken in connection with the accompanying drawings.

Typical inventions among those disclosed in this application are briefly as follows.

In a motor drive semiconductor integrated circuit for moving a magnetic head for reading information from a storage track on a magnetic disk driven for rotation by conducting feedback control of a driving current flowing through a coil of the voice coil motor while detecting the driving current, the first invention of this application executes driving current control of a voice coil motor necessary for moving the magnetic head such as a seek operation and a track follow operation of the magnetic head on the basis of a command value from a controller by PWM (pulse width modulation) driving.

According to the means described above, the seek operation and the track follow operation are conducted by solely PWM driving. Therefore, the shift from the seek operation to the track follow operation and vice versa can be executed smoothly and quickly with a small time loss. Because a control circuit for PWM driving and a control circuit for linear driving need not be separately designed, a design load can be reduced and a circuit scale can be decreased. Furthermore, because degradation of characteristics of output MOS transistors due to hot carriers is more difficult to occur in PWM driving than in linear driving, an economical CMOS process can be employed more easily and the production cost can be reduced.

Here, load operation control for moving the magnetic head from its standby position onto the disk is preferably executed by PWM driving, too. Settling operation control for shifting from the seek operation to the track follow operation is preferably made by PWM driving, too. Furthermore, unload operation control for moving the magnetic head from on the disk to the standby position can be preferably made by PWM driving.

In the second invention of this application, the whole control circuit for making feedback control of the voice coil motor is constituted into a digital circuit. Because the control circuit of the voice coil motor has been constituted in the past by the analog circuit, the circuit is weak to external noise, an error is likely to occur due to offset and a high precision circuit cannot be produced easily because the analog circuit is susceptible to variance of production. These problems can be solved by constituting the whole control circuit by the digital circuit.

A ΣΔ (sigma/delta) modulator is preferably used as a modulation circuit for generating a control signal for controlling an output driver from a difference signal between a current command value and a current detection value. When the control circuit is constituted by the digital circuit, a quantization noise becomes a problem. Because the ΣΔ modulation circuit has characteristics that diffuse the quantization noise into a high frequency range, it can reduce the noise in a low frequency range necessary for positioning control of the voice coil motor and can improve its S/N ratio. On the other hand, the increasing noise in the high frequency range can be suppressed relatively easily by a filter (digital filter, etc).

Another invention of this application is to solve new problems that occur when the whole control circuit of the voice coil motor is constituted by the digital circuit, and includes the following means.

First, though the noise in the high frequency range occurring on the side of the ΣΔ modulator is generally removed by disposing a filter, the invention does not use the filter but averages and attenuates this noise with the noise occurring in a D/A conversion circuit (PWM pulse generation circuit, etc) for converting the control signal to an analog signal, by utilizing the time constant (integration operation) of the coil of the motor. More concretely, the output signal of the modulator is directly inputted to the D/A conversion circuit to generate a PWM pulse or PAM pulse for controlling the output driver. In consequence, the filter in the post-stage of the ΣΔ modulator can be eliminated and the control circuit can be simplified as a whole.

Here, a multi-bit quantizer but not a one-bit quantizer is preferably used as a quantizer of the ΣΔ modulator. The one-bit quantizer is more suitable as the quantizer of the ΣΔ modulator for increasing the operation speed of the control circuit but when the one-bit quantizer is used, linearity gets deteriorated due to a switching delay of the output drive circuit, so that S/N ratio gets deteriorated and the switching loss due to the output drive circuit increases. Because diffusion of the high frequency noise can be concentrated on the frequency band lower than the PWM frequency when the multi-bit quantizer is used, however, the S/N ratio can be improved and the switching loss in the output drive circuit can be reduced.

Second, the invention arranges a phase compensator constituted by an integration type digital filter in a pre-stage of the ΣΔ modulator. Because the control circuit of the voice coil motor has the negative feedback loop, a phase compensator must be disposed to stabilize the system and to prevent oscillation, but the control circuit can be simplified as a whole by disposing the phase compensator in the pre-stage of the ΣΔ modulator. In other words, a predictor for oversampling to reduce the quantization noise is necessary in the pre-stage of the ΣΔ modulator operating at a frequency higher than an updating frequency of the current command value. In the invention, the circuit for conducting phase compensation of the whole control system is constituted by the integration type digital filter and is disposed in the pre-stage of the ΣΔ modulator and is allowed to operate also as the estimation device. Consequently, the predictor need not be disposed separately and the control circuit can be simplified. The frequency band of the whole VCM driver circuit of the invention can be improved because the time delay occurring in the predictor can be reduced.

Here, the phase compensator preferably uses a PI type controller having integration characteristics for only a low frequency range and is disposed in the pre-stage of the ΣΔ modulator. In this way, the transmission characteristics of the input conversion noise with respect to the output driving current of the quantization noise occurring in the ΣΔ modulator and in the D/A converter in the post-stage of the ΣΔ modulator are allowed to possess the differential characteristics and add to the differential characteristics of the ΣΔ modulator. Therefore, the S/N ratio in the low frequency range can be further improved. The S/N ratio in the low frequency range of the voice coil motor drive circuit can be substantially decided by accuracy of the current detection stage and accuracy can be improved by using the ΣΔ modulation type A/D conversion circuit for the current detection stage. A register for setting the filter coefficient of the phase compensator is disposed further preferably. Consequently, the phase compensator can be set in such a fashion as to attain the optimal characteristics in accordance with the specification of the magnetic disk storage apparatus applied by changing firm-ware.

In the third place, the invention uses, as current detection means, means for quantizing (A/D conversion) the current flowing through the coil (inclusive of its reproduction current) after it is averaged by integration using high speed sampling. More concretely, the current detection means is constituted by a current detection amplifier and an A/D conversion circuit for converting the analog signal detected by the amplifier to a digital signal and an over-sampling type A/D conversion circuit is used as the A/D conversion circuit. Therefore, the detection error resulting from jitter of the sampling pulse can be eliminated and a mean current when the duty ratio of the PWM pulse is small can be detected. The sampling cycle conducted at the time of quantization can be set independently of the cycle of PWM driving, the band of the whole voice coil motor drive circuit can be easily improved.

Here, the A/D conversion circuit for converting the detection signal to the digital signal preferably uses a $\Sigma\Delta$ modulation type A/D conversion circuit. Because the quantization noise is diffused into the high frequency range, the noise in the low frequency range necessary for positioning control of the voice coil motor can be reduced and the S/N ratio can be improved. Incidentally, a predictor for over-sampling is generally necessary in the pre-stage of the $\Sigma\Delta$ AD modulation type A/D conversion circuit but the integration characteristics of the coil of the voice coil motor replaces the predictor and the predictor is omitted. In other words, the detection signal outputted from the current detection amplifier is directly inputted to the A/D conversion circuit. Consequently, the predictor becomes unnecessary and the control circuit can be simplified as a whole.

A decimation filter having low-pass and frequency thin-out functions is preferably disposed in the post-stage of the $\Sigma\Delta$ modulation type A/D conversion circuit. It is thus possible to suppress the noise in the high frequency range that increases due to the use of the $\Sigma\Delta$ modulation type A/D conversion circuit as the current detection means. Further preferably, a phase lead compensator is disposed in the post-stage of this decimation filter. In this way, it is possible to prevent the whole voice coil motor drive circuit from becoming unstable (gain peaking) due to the delay of the decimation filter.

Still another invention of this application constitutes the control circuit of the voice coil motor as a whole by a digital circuit, uses a $\Sigma\Delta$ modulator as a modulation circuit for generating a signal controlling an output driver from a difference signal between a current command value and a current detection value and disposes a back electromotive force estimation circuit for estimating a back electromotive force occurring in the coil on the basis of the output of the current detection means and a high precision driving voltage command signal as the input of the $\Sigma\Delta$ modulator. The back electromotive force occurring in the coil can be calculated using a model of a coil impedance from the power source voltage of the voice coil motor drive circuit, the current flowing through the coil and the driving voltage of the coil without directly detecting it. However, because these parameters originally exist inside the control circuit having the construction described above, they can be easily acquired by calculation. Therefore, an amplifier for detecting the complicated back electromotive force need not be disposed, the circuit scale can be reduced and a low cost of production can be achieved.

In a voice coil motor drive circuit for moving a magnetic head over a magnetic disk for reading information from a storage track on the magnetic disk driven and rotated by conducting feedback control of a driving current flowing through a coil of the voice coil motor while detecting the driving current, still another invention of this application executes current control for moving the magnetic head such as a seek operation and a track follow operation of the magnetic head on the basis of a command value from a controller by PWM driving, drives by PWM driving either one of a driver circuit for driving either one of the terminals of the coil and a driver circuit for driving the other terminal of the coil in every ½ cycle and keeps the control signal of the other driver circuit under the fixed state during the ½ cycle.

According to the means described above, fluctuation of the driving current occurring in one cycle of the PWM pulse can be made small, and the noise resulting from PWM driving can be reduced. Because a different current command value can be given in every ½ cycle, current control becomes possible at a higher speed response than the conventional PWM driving system that applies the current command value in each cycle.

Still another invention of this application includes a delay time measurement circuit for measuring a delay time of a signal for controlling a driver circuit by a rise or fall timing of an output voltage of a driver circuit driving terminals of a coil of a voice coil motor drive circuit, a variable delay circuit for delaying the signal for controlling the driver circuit for an arbitrary time, and a negative feedback control loop for changing the delay time of the signal by feeding back the time measured by the delay time measurement circuit to the variable delay circuit.

In consequence, deviation of the propagation delay time occurring in the driver circuit due to production variance, temperature change and power source voltage fluctuation can be automatically regulated and the drop of linearity in PWM driving control can be prevented. Here, the delay time measurement circuit may be disposed as a common circuit to the driver circuit for driving one of the terminals of the coil and the driver circuit for driving the other terminal but higher precision PWM driving control is insured when the delay time measurement circuits are disposed separately.

Still another invention of this application includes a transition time measurement circuit for measuring a transition time of an output signal of a driver circuit for detecting the time necessary for the rise or fall of the output voltage of the driver circuit for driving the coil terminal of the voice coil motor drive circuit, a tilt regulation circuit for arbitrarily setting a change speed of a signal controlling the driver circuit and a negative feedback control loop for feeding back the time measured by the transition time measurement circuit to the tilt regulation circuit and changing the transition time of the signal.

Accordingly, deviation of the transition time occurring in the driver circuit due to production variance, temperature change and power source voltage fluctuation can be automatically regulated. Because the transition time can be controlled highly precisely, it becomes possible to prevent the occurrence of an error in positional information and storage information as a noise couples with the signal read out by the head due to a sharp change of the output signal of the driver circuit in a cable for propagating the output signal of the driver circuit. Here, regulation of the transition time may be conducted by disposing a register for setting the transition time in accordance with the value set from an external controller to the register but it is also possible to regulate the transition time in proportion to a current command value on the basis of the command value supplied to the vice coil motor drive circuit from a controller.

Still another invention of this application constitutes a control circuit for feedback controlling a voice coil motor by a digital circuit as a whole, and disposes an offset calibration circuit for canceling offset occurring in the whole control system at an intermediate part of a route for feeding back the detected coil current. Because the whole control circuit is constituted by the digital circuit, offset calibration circuits required for various positions in existing analog control system can be concentrated to one position and the increase of the circuit scale can be suppressed. When the circuit for converting the detected coil current to a digital signal includes a $\Sigma\Delta$ modulation type A/D conversion circuit and a decimation filter disposed in the post-stage of the former, the offset calibration circuit is preferably arranged in the post-stage of the decimation filter.

Still another invention of this application disposes a current detection circuit including a coil current reproduction circuit disposed in parallel with an output transistor of a driver circuit for flowing a driving current through a coil of a voice coil motor and having a sense transistor having a predetermined size ratio, for flowing a current proportional to a current of the output transistor and an error amplifier for flowing the current reproduced by the coil current reproduction circuit through a sense resistor and amplifying the resulting voltage drop. In the voice coil motor drive circuit of the prior art (patent document 1), an error amplifier amplifies the voltage drop occurring in a sense resistor connected in series with a coil of a motor to detect a coil current, hence the power loss occurs in the sense resistor. According to the invention, however, the sense resistor to be connected in series with the coil of the motor becomes unnecessary, a coil current reduced proportionally is allowed to flow through the sense resistor separately disposed and the power loss can be therefore reduced.

In the voice coil motor drive circuit described in the patent document 1, the resistance divided voltage is inputted to the error amplifier for amplifying the voltage drop occurring in the sense resistor. When the resistor used for resistance division is of an on-chip type, the resistance value has bias dependence of an island potential. Therefore, when a current detection error occurs or a ratio of resistors used for resistance division loses matching due to production variance or local temperature rise, CMRR (in-phase noise removal ratio) of the error amplifier drops with the result that the detection error is likely to occur. Because the voltage dividing resistor of the input voltage to the error amplifier is not necessary according to the invention, however, the detection error can be reduced.

Here, the invention preferably disposes in the current detection circuit a current addition circuit for always flowing an offset current so that a forward current flows through the sense transistor even when a current in an opposite direction flows through the output transistor during power regeneration of PWM driving, and an offset current cancel circuit for preventing the offset current from being added to the detection current. Further preferably, the invention disposes a judgment circuit for judging the condition when the output transistor as the current detection object is not in the ON resistance region and a correct current cannot be reproduced by the current reproduction circuit, and hold means capable of holding the detection current, and allows the hold means to hold the detection current immediately before this condition. Accordingly, it is possible to avoid detection of the wrong current and to conduct higher precision current detection.

Still another invention of this application disposes a power source voltage detection circuit for detecting the power source voltage of the voice coil motor drive circuit, compares the detection voltage with a reference voltage and changes a duty ratio of the driving control signal (PWM driving pulse) or the output voltage value in accordance with the difference between them. Consequently, the error current of the coil resulting from fluctuation of the power source voltage can be reduced. Here, when the signal for changing the duty ratio of the PWM driving pulse or the output voltage value is generated by the $\Sigma\Delta$ modulator, a multiplier operating as a variable gain amplifier is provided to the input portion of the $\Sigma\Delta$ modulator and is operated in such a fashion that the gain of this amplifier is inversely proportional to the change of the power source voltage.

The effects acquired by typical inventions among those disclosed in this application are briefly as follows.

Namely, the invention can acquire a drive control semiconductor integrated circuit for a coil motor capable of executing high precision driving control.

BRIEF DESCRIPTION OF THE DRAWINGS

FIG. 22 is a timing chart comparatively showing the relation between an input instruction value and a drive pulse in the motor drive circuit of the embodiment for PAM modulation control shown in FIG. 21 with the relation between the input instruction value and the drive pulse in the motor drive circuit of the embodiment for PWM modulation control shown in FIG. 2.

DESCRIPTION OF THE PREFERRED EMBODIMENTS

Preferred embodiments of the invention will be hereinafter explained with reference to the accompanying drawings.

Figure 1:
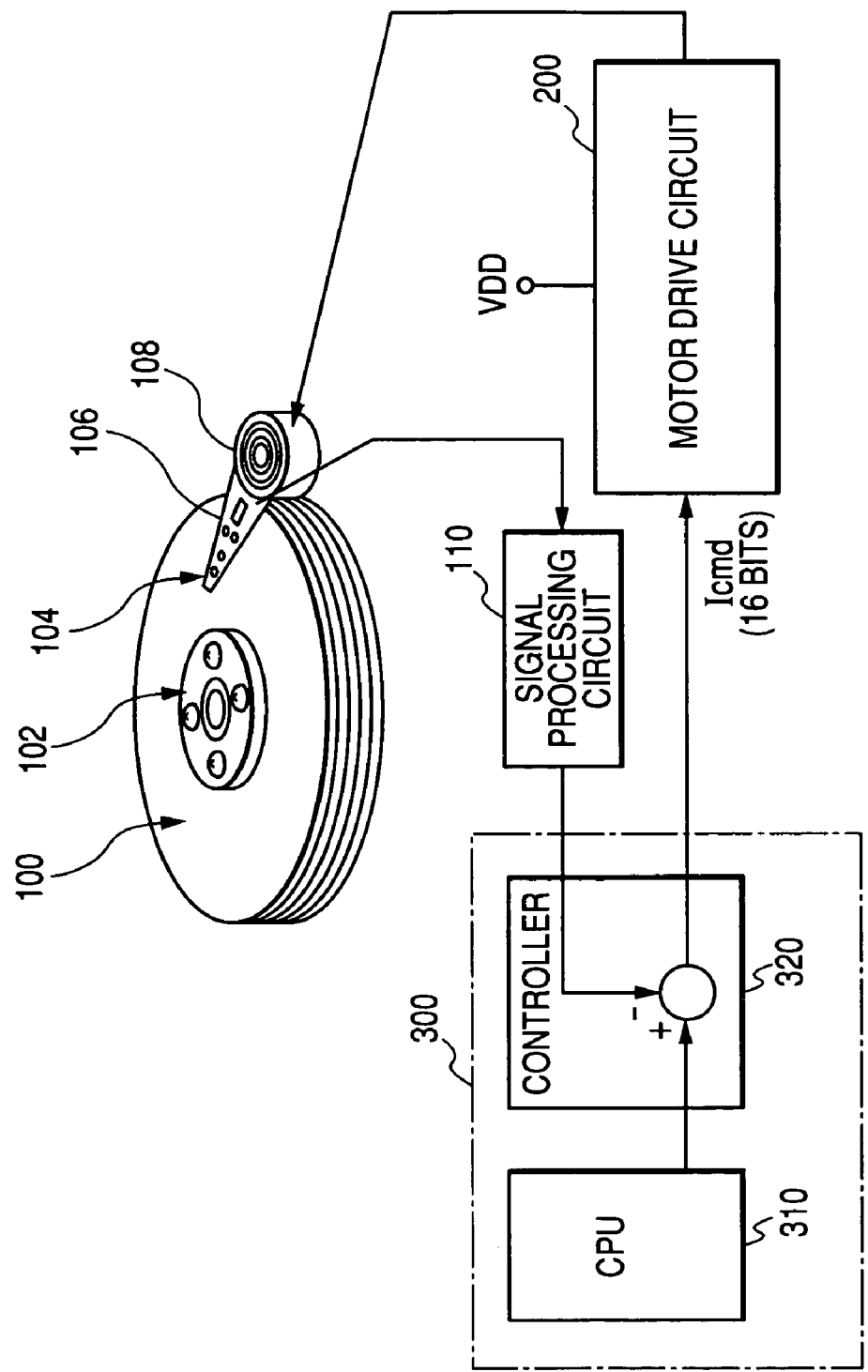
FIG. 1 is a block diagram showing an outline of a magnetic disk storage apparatus to which the invention is applied.

FIG. 1 shows an outline of a magnetic disk storage apparatus to which the technology of the invention is applied.

The magnetic disk storage apparatus shown in the drawing includes a magnetic disk 100, a spindle motor 102 for driving and rotating the magnetic disk 100, a magnetic head (inclusive of a write magnetic head and a read magnetic head) 104 for executing read/write of information to and from a storage track on the magnetic disk 100, an arm 106 having the magnetic head 104 at its distal end, a voice coil motor 108 for rotating the arm 106 and moving the magnetic head 104 in a radial direction over the disk 100, a motor drive circuit 200 for driving the voice coil motor 108, a signal processing circuit (signal processing IC) 110 for reading position information from the read signal of the magnetic head 104 and a control portion 300 for sending a drive current command value Icmd to the motor drive circuit 200 on the basis of the position information read out by the signal processing circuit 110.

Here, the control portion 300 includes a microcomputer (CPU) 310 for controlling as a whole the operation of the magnetic disk storage apparatus and a controller 320 for generating a drive current command value Icmd of a 16-bit binary code, for example, on the basis of the position command (target track position information) from the microcomputer 310 and the head position information from the signal processing circuit 110. The drive current command value Icmd generated by this controller 320 is sent in the form of the complement of 2 or an offset binary to the motor drive circuit 200 so that the flowing direction of the current can be designated. The motor drive circuit 200 is not particularly limited and is fabricated into a semiconductor integrated circuit in one semiconductor chip such as single crystal silicon in this embodiment.

Figure 2:
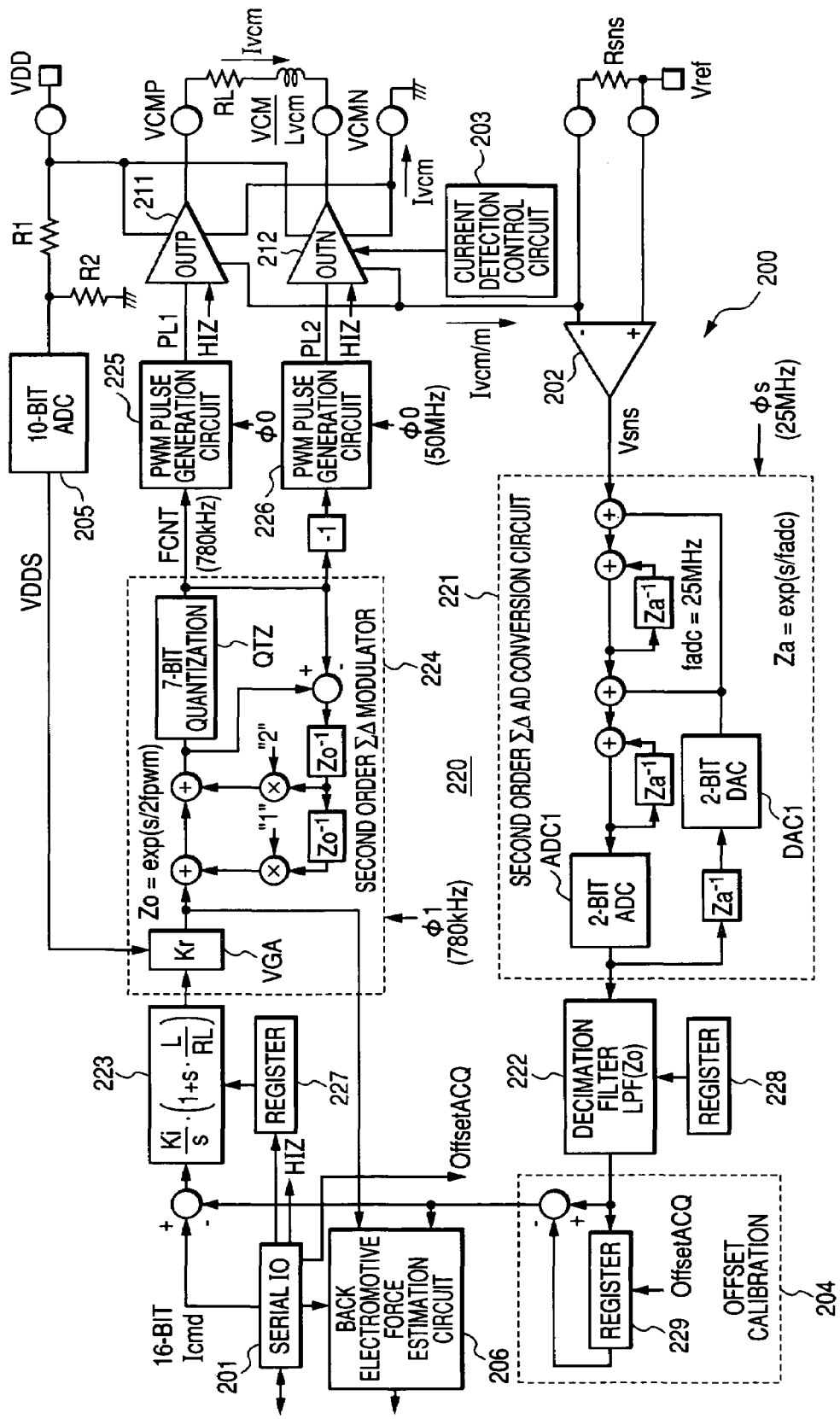
FIG. 2 is a block diagram showing a structural example of a voice coil motor drive circuit that constitutes the magnetic disk storage apparatus to which the invention is applied.

FIG. 2 shows the construction of the motor drive circuit 200 for driving and controlling the voice coil motor 108.

As shown in the drawing, the motor drive circuit 200 includes a serial port 201 for execution data transmission/reception serially to and from the controller 320, an error amplifier (hereinafter called current detection amplifier") 202 for detecting a voltage generated at both ends of a sense resistor Rsns through which a current is caused to flow in proportion to the current flowing through a coil LVCM of a voice coil motor VCM, a current detection control circuit 203 for conducting control so that a current flows through the sense resistor Rsns, the current is proportional to the current outputted by output drivers 211 and 212 for flowing desired currents by applying a drive voltage to both ends of the coil LVCM, a digital control circuit 220 for generating a drive control signal of the drivers 211 and 212 on the basis of the drive current command value Icmd received from the controller 320 through the serial port 201 and an output voltage Vsns in proportion to the drive current Ivcm detected by the current detection amplifier 202, an offset calibration circuit 204 for calibrating the offset generated in the control circuit 220, voltage division resistors R1, R2 and an AD conversion circuit 205 for detecting a voltage value of a power source voltage VDD and a back electromotive force estimation circuit 206 for calculating a back electromotive force Vb-emf (estimated value) of the coil on the basis of the signal inside the digital control circuit 220 and supplying the calculation result as speed information to the controller 320. The circuit block and the devices other than the voice coil motor VCM and the sense resistors Rsns shown in FIG. 2 are fabricated into a semiconductor integrated circuit.

The back electromotive force estimation circuit 206 can readily calculate the back electromotive force Vb-emf in accordance with the following formulas:

$$Vb\text{-}emp = Vout - Ivcm \cdot RL$$

$$Vout = (2/CNT) \cdot VDD0$$

where CNT is an output of a multiplier VGA inside a later-appearing modulation circuit 224, Ivcm is a current of the coil, RL is a parasitic resistance of the coil and VDD0 is a reference value of the power source voltage VDD of the control circuit.

Therefore, the back electromotive force estimation circuit 206 can be constituted by a resistor for holding the RL value and the VDD0 value, a multiplier and an adder/subtracter and a complicated back electromotive force detection circuit that has been necessary in analog control systems in the prior art can be eliminated.

The back electromotive force value Vb-emf calculated by the back electromotive force estimation circuit 206 can be sent to the controller 320 through the serial port 201. The controller 320 can recognize the moving speed of the head from the back electromotive force it receives, and can utilize the moving speed for speed control of the voice coil motor at the time of the head load at which the magnetic head is moved from the standby position called "ramp" onto the disk. When the moving speed of the magnetic head is too high, the magnetic head is likely to impinge against the disk surface and to damage it but this problem can be avoided through the speed control.

The digital control circuit 220 includes an A/D conversion circuit 221 for converting the output signal of the error amplifier 202 to a digital signal, a decimation filter 22 disposed in the post-stage of the former, a phase compensation circuit 223 for conducting calculation for the phase compensation for the difference between the detection current value outputted from the decimation filter 222 and the drive current command value Icmd sent from the controller 320, a modulation circuit 224 for converting the phase-compensated current value to a control code signal CNT having a predetermined number of bits (7 bits in the embodiment) and PWM pulse generation circuits 225 and 226 as D/A conversion means for generating drive control signals of the VCM drivers 211 and 212 described above on the basis of the output signal of the modulation circuit 224 and its code inversion signal.

Each of the decimation filter 222 and the phase compensation circuit 223 described above in this embodiment has low-pass filter characteristics and is constituted by a digital filter. Each of the PWM pulse generation circuits 225 and 226 can be constituted by a counter and a comparator. The modulation circuit 224 applies count values FCNT and −FCNT corresponding to the pulse width of the output drive signal to the PWM pulse generation circuits 225 and 226 from the current command value and the current measurement value. The PWM pulse generation circuits 225 and 226 operate by a clock φ0 such as 50 MHz and generate and output drive control signals (PWM drive pulses) PL1 and PL2 so that drive voltages VCMP and VCMN having a duty ratio corresponding to the count value described above can be outputted from the drivers 211 and 212. This embodiment uses a 7-bit quantizer as a quantizer QTZ of the output portion of the modulation circuit 224 so as to optimize the noise due to PWM driving while a switching loss in the output stage is kept at a suitable level.

Registers 227 and 228 for holding coefficients necessary for the calculation in the decimation filter 222 and the phase compensator 223 are respectively disposed in the digital control circuit 220. The values sent from the controller 320 at the time of initialization are set to and held by these registers 227 and 228. The offset calibration circuit 204 is so constituted as to set a value resulting from the offset of the entire current detection circuit as an offset cancel value ACQ of the current detection system to the register 229 when a signal that brings the output amplifiers 211 and 212 to the high impedance state at the time of initialization is given from the controller 320.

This embodiment uses a second order ΣΔ modulation type A/D conversion circuit (hereinafter called "ΣΔ type A/D conversion circuit") as a kind of an over-sampling type A/D converter for the A/D conversion circuit 221 and a second order ΣΔ type modulation circuit for the modulation circuit 224. The ΣΔ type A/D conversion circuit 221 has at its output portion a 2-bit A/D converter ADC1 for generating a digital output signal and a 2-bit D/A converter DAC1 for generating an analog feedback signal and is operated in synchronism with a sampling clock φs having a frequency such as 25 MHz. The ΣΔ type modulation circuit 224 has at its input portion a multiplier operating as a variable gain amplifier VGA and at its output portion a 7-bit quantizer QTZ and is operated in synchronism with a clock φ1 having a frequency such as 780 kHz having a cycle of ½ of the cycle (390 kHz) of PWM control in such a manner as to correspond to this cycle (390 kHz).

The gain Kr at the variable gain amplifier VGA of the input portion of the ΣΔ type modulation circuit 224 is decided by a ratio VDD0/VDDS·(1+R1/R2) of the detection power source voltage VDDS outputted from the A/D conversion circuit 205 and the reference value VDD0 of the power source voltage VDD. Because the voltages VCMP and VCMN outputted from the drivers 211 and 212 by PWM driving are proportional to the power source voltage VDD, fluctuation of the power source voltage VDD results in distortion of the output voltage and deteriorates PSRR (Power Supply Rejection Ratio). Therefore, this embodiment uses the A/D conversion circuit 204 for detecting the power source voltage VDD and the multiplier operating as the variable gain amplifier VGA is disposed in the input portion of the ΣΔ type modulation circuit 224 so that the gain Kr of the amplifier can be so controlled as to be inversely proportional to the change of the power source voltage VDD to attain high PSSRR.

As described above, the motor drive circuit of this embodiment uses the ΣΔ type A/D conversion circuit and the ΣΔ type modulation circuit so as to utilize the noise shaping characteristics (noise shaping) as the feature of the ΣΔ type circuit that can reduce the noise in the low frequency range by diffusing the noise to the high frequency range. In other words, because the control band of the drive circuit of the voice coil motor is below dozens of kHz and is relatively low, the noise in the low frequency range is reduced and control accuracy is improved by using the ΣΔ type circuit. The noise in the high frequency range that increases in such a manner as to correspond to the decrement of the noise in the low frequency range is suppressed by the decimation filter 222 operating as the low-pass filter disposed in the post-stage of the ΣΔ type A/D conversion circuit 211.

Incidentally, various types of A/D conversion circuits such as a sequential comparison type and an over-sampling type have been developed in the past. When an analog input signal is converted to a digital signal by using the A/D conversion circuit, an S/N (Signal to Noise Ratio) can be generally improved in the proximity of the signal frequency by increasing the sampling frequency. The over-sampling type A/D conversion circuit is the system that improves the S/N characteristics by increasing the over-sampling ratio.

The over-sampling type A/D conversion circuit can be broadly divided into a Δ modulation type, a ΣΔ modulation type and their mixture type. Among them, the ΣΔ modulation type integrates the difference between the output signal and the input signal and executes feedback control so that the output of this integrator becomes minimal. In this ΣΔ modulation type, the S/N characteristics can be further improved by increasing the number of orders of integration, that is, the number of the integrators. Noise shaping characteristics proportional to the frequency can be expected when the number of orders of integration is increased by one. When the number of orders of integration is increased, however, problems develop in that stability of the system drops and consumed power becomes greater. In this embodiment, ΣΔ type A/D conversion circuits 221 and the ΣΔ type modulation circuit 224 are the secondary circuits, respectively.

The inventors of the invention have reached the concept that over-sampling type A/D conversion circuit, especially the ΣΔ modulation type A/D conversion circuit, is suitable from the aspects of conversion accuracy and the conversion speed as the A/D conversion circuit for converting the output signal of the sense amplifier 202 assembled in the voice coil motor drive IC and detecting the coil current to the digital signal and feeding back the digital signal. When the ΣΔ modulation type is used, the number of quantization bits can be decreased and the circuit can be simplified due to the noise shaping characteristics effect much more than when the sequential comparison system well known as the ordinary 16-bit A/D conversion circuit is used together with the over-sampling system not using noise shaping. In addition, high accuracy can be stably accomplished without calibration of current cells against variance of production of the current cells.

Another reason why the ΣΔ modulation system as a kind of the over-sampling type A/D conversion circuit is used as the circuit for converting the signal detecting the current Ivcm flowing through the coil to the digital signal is because the current detection error can be made smaller by sampling the detection signal in a shorter cycle than the cycle of PWM driving in comparison with the case where the ordinary 16-bit A/D conversion circuit is used.

Figure 14:
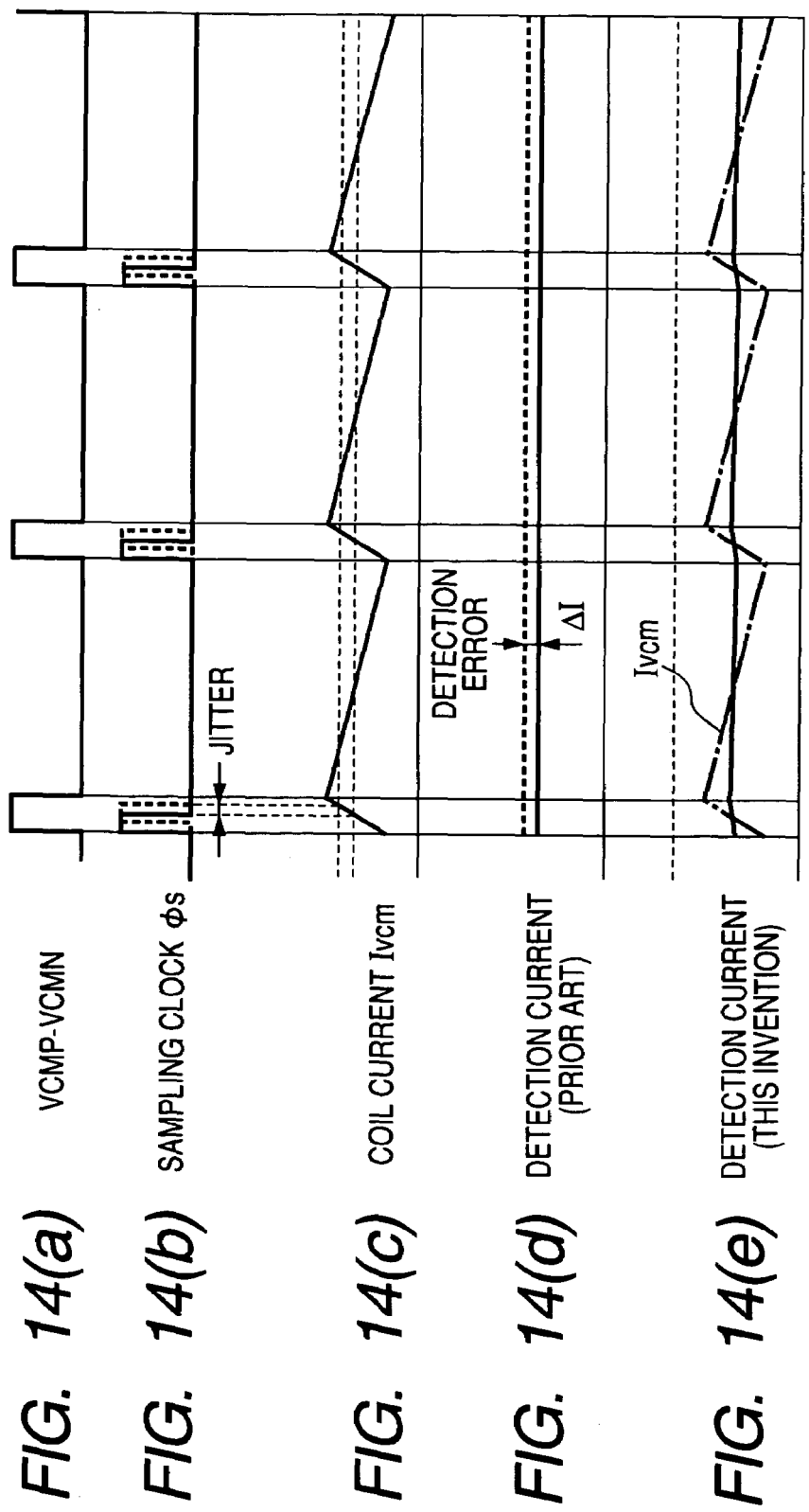
FIG. 14 is a timing chart showing an operation example of a current detection circuit provided to the voice coil motor drive circuit of the embodiment and a current detection circuit in the voice coil motor drive circuit of the type the inventor previously examined.

In other words, when the ordinary 16-bit A/D conversion circuit is used, a system that samples as a representative value the coil current Ivcm at the center of the PWM pulse as shown in FIGS. 14A to 14C may be employed. However, the sampling clock φs used for this system is ordinarily generated by VCO (Voltage Control Oscillator), or the like, and has in most cases jitter as indicated by dotted lines, so that an error ΔI is likely to occur in the detection current Isns as shown in FIG. 14D. Because the invention of the analog control system described in the afore-mentioned patent document 1, too, employs the system that samples the coil current Ivcm at the center point of the PWM pulse as the representative value and (see FIGS. 3 and 4 of patent document 1), the similar detection current error ΔI is likely to occur.

In contrast, the voice coil motor drive circuit of this embodiment uses the over-sampling type A/D conversion circuit as the circuit for digitally converting the detection signal of the coil current Ivcm, samples the detection signal in a shorter cycle than the cycle of PWM driving and conducts smoothing by the integration function of the ΣΔ type A/D conversion circuit. Consequently, the current detection error due to clock jitter can be neglected in principle as shown in FIG. 14E.

Incidentally, the detailed explanation of the constructions and operations of the ΣΔ type A/D conversion circuit and the ΣΔ type modulation circuit will be omitted because they are well known in the art. The A/D converter ADC1 for the output and D/A converter DAC1 for feedback of the ΣΔ type A/D conversion circuit 221 have the 2-bit construction to reduce the noise of the low frequency range and to suppress the increase of the circuit scale.

Incidentally, a prediction device (interpolation processing) for over-sampling is generally necessary in a pre-stage of the ΣΔ type modulator. However, this embodiment constitutes the phase compensation circuit 223 for phase compensation of the entire motor drive circuit by using the integrator and allows it to operate also as the prediction device of the ΣΔ type modulation circuit 224. The prediction device on the side of the A/D conversion circuit 221 for current detection is omitted because the coil is allowed to operate also as the prediction device because the integration characteristics of the coil operate as the prediction device at the time of PWM driving.

The phase compensation circuit 223 is the circuit disposed for compensating for the primary delay characteristics of the coil impedance of the voice coil motor, keeping the entire system at the primary delay and improving the S/N ratio of the output stage. In this embodiment, the phase compensation circuit 223 is constituted by the integrator as can be appreciated from the transmission functions shown inside the block of the phase compensation circuit 223 in FIG. 2. Symbol "s" is a variable used for expressing the function that is Laplace transformed.

In this embodiment, the phase compensation circuit 223 for phase compensating the feedback loop of the whole voice coil motor drive circuit is a PI type controller having the integration characteristics in the low frequency range and the proportional characteristics in the high frequency range and arranged in the pre-stage of the ΣΔ type modulation circuit 224 so that the transmission characteristics of the input calculation noise of the quantization noise occurring in the modulator (quantizer) with respect to the output driving current have differential characteristics.

Consequently, the S/N ratio in the low frequency range is further improved and the S/N ratio in the low frequency range of the voice coil motor drive circuit 200 in this embodiment can be substantially decided by accuracy of the current detection stage (A/D conversion circuit 221) because the differential characteristics described above add to the differential characteristics of the ΣΔ type modulation circuit 224. However, this embodiment can reduce the S/N ratio of the whole circuit because it uses the ΣΔ type A/D conversion circuit 221 having the noise shaping effect as the current detection stage.

Figure 9:
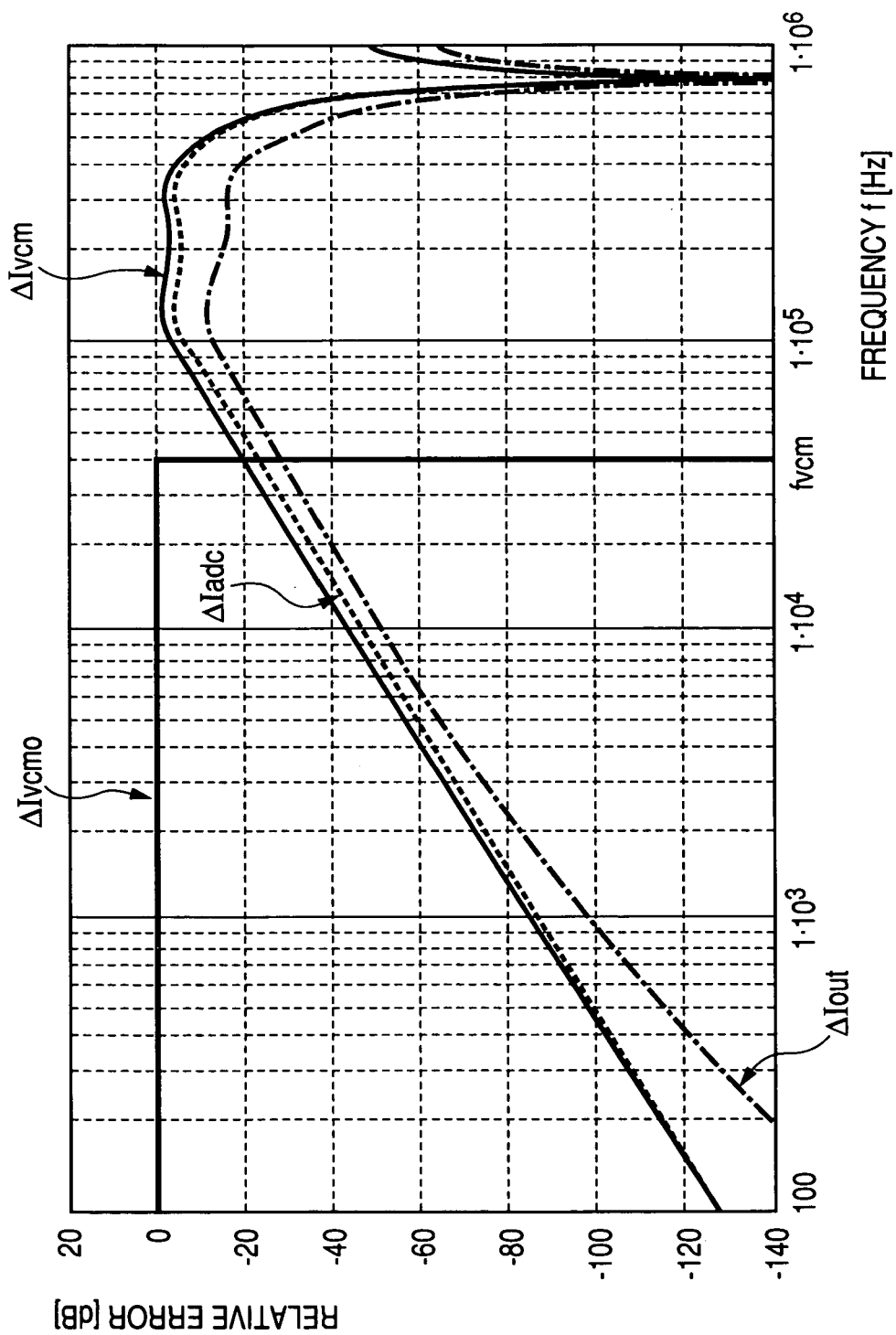
FIG. 9 is a graph showing an error current $\Delta$Iadc generated in a current detection stage of the voice coil motor drive circuit, an error current $\Delta$Iout generated in an output stage and an error current $\Delta$Ivcm of the whole circuit in the embodiment.

FIG. 9 shows the error current ΔIadc occurring in the current detection stage of the voice coil motor drive circuit 200 of this embodiment, the error current ΔIout occurring in the output stage (phase compensation circuit, modulation circuit and PWM generation circuit) and the error current ΔIvcm of the whole circuit. It can be appreciated from FIG. 9 that the error current ΔIadc occurring in the current detection stage is greater than the error current ΔIout occurring in the output stage but the error current ΔIvcm of the whole circuit is somewhat greater than the error current ΔIadc occurring in the current detection stage. Incidentally, ΔIvcmo in FIG. 9 represents the error current of an ideal 16-bit D/A converter having a 40 kHz band. All the error current values shown in FIG. 9 are normalized by ΔIvcmo (at f<fvcm).

Incidentally, the theoretical S/N ratio of the current detection stage in this embodiment can be approximated by the following equation (1):

$$SNR= \qquad (1)$$

where n: order number of ΣΔ modulation
N: quantization bit number of ΣΔ modulation
ovsa: over-sampling ratio (=fadc/2fvcm)
fadc: sampling rate of ADC for current detection [Hz]
fvcm: band of VCM driver of this embodiment [Hz]

It is hereby assumed that the input signal (current command value Icmd) is band-limited to fvcm (that is, Nyquist frequency is fvcm).

Figure 3:
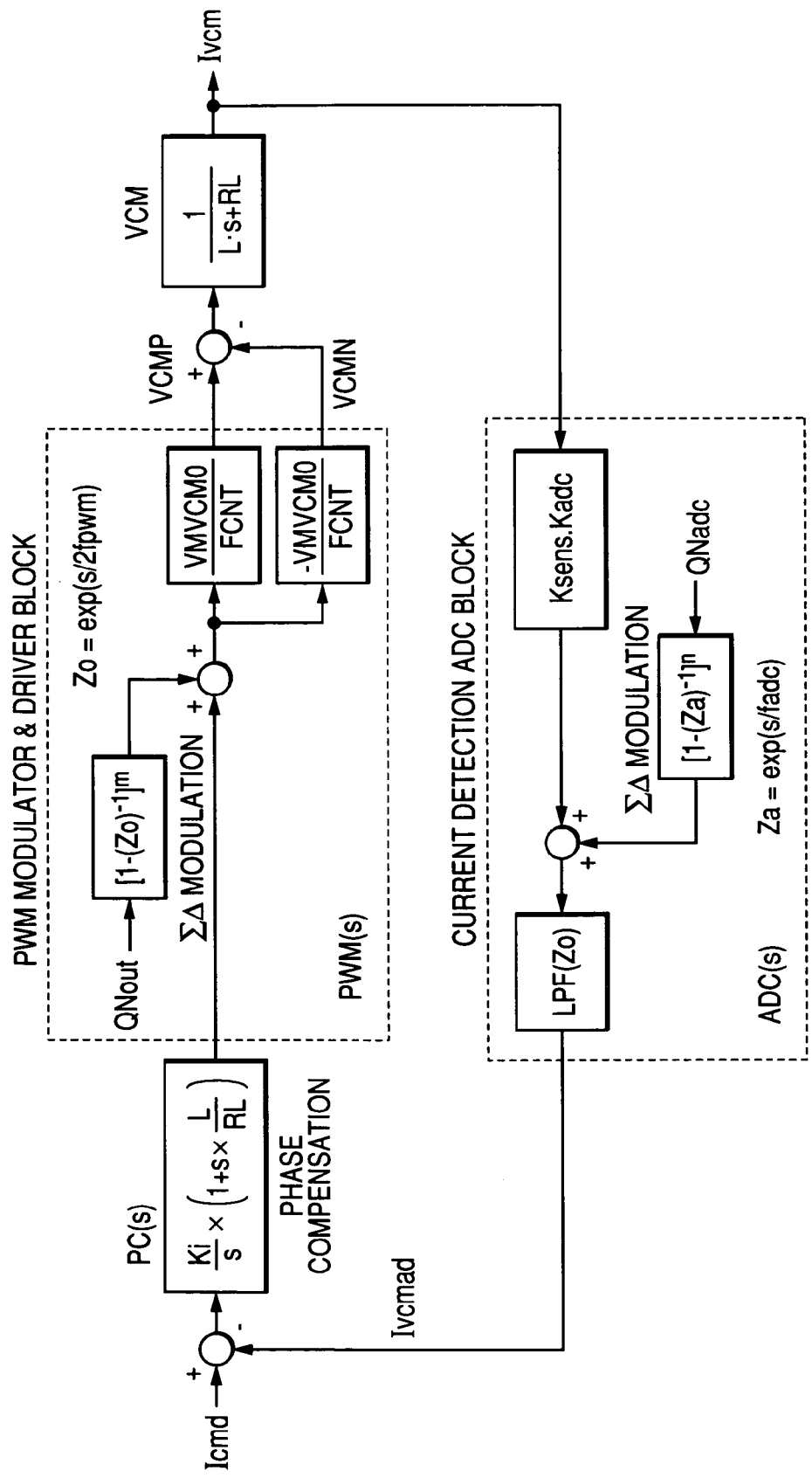
FIG. 3 is an explanatory view showing the voice coil motor drive circuit and the voice coil motor shown in FIG. 2 in terms of transmission functions.

FIG. 3 shows the voice coil motor VCM and the motor drive circuit 200 of the embodiment shown in FIG. 2 in terms of transmission functions. In FIG. 3, symbol "Ksens" represents the gain of the error amplifier 202, "Kadc" represents the gain of the A/D conversion circuit 221, "QNadc" represents the quantization noise in the A/D conversion circuit 221, "QNout" represents the quantization noise in PWM modulation, "VDD0" represents the reference of the power source voltage and "FCNT" represents the count values to be counted by the PWM pulse generation circuits 225 and 226. The count value is given from the ΣΔ type modulation circuit 224 to the PWM pulse generation circuits 225 and 226.

Figure 4:
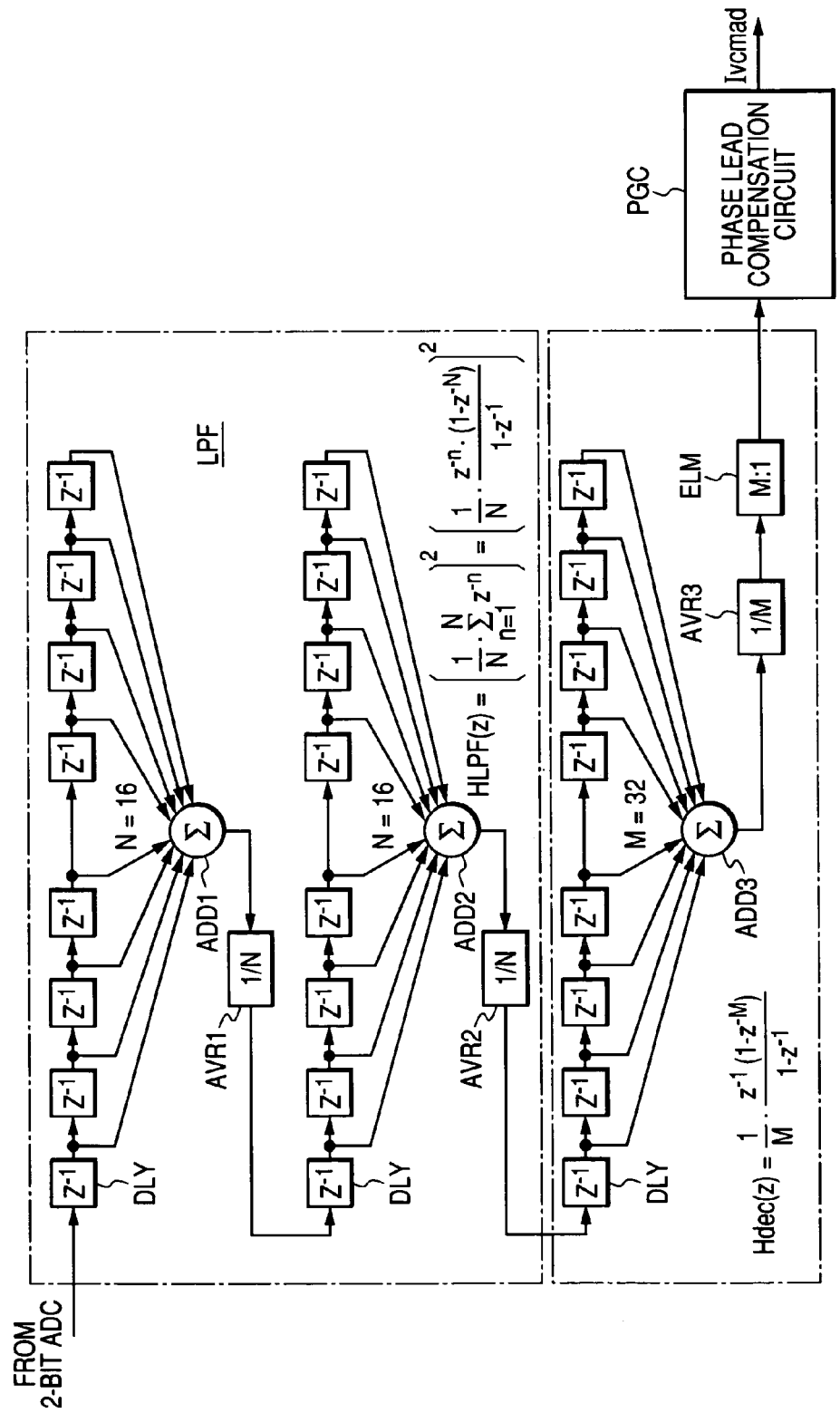
FIG. 4 is a structural view showing a concrete example of a decimation filter constituting a voice coil motor drive circuit in an embodiment.

FIG. 4 shows a concrete example of the decimation filter 222 in the motor drive circuit 200 in the embodiment shown in FIG. 2.

The decimation filter of this embodiment includes a low-pass filter portion LPF, a thin-out processing portion ELM and a phase advance compensation portion PGC. The low-pass filter portion LPF includes a cascade circuit of FIR (finite impulse response) filters FIR1 and FIR2 each of which has a filter coefficient "1", N (N=16, for example) delay stages DLY and an adder ADD and averaging circuits AVR1 and AVR2 for calculating the average of their outputs. The thin-out processing portion ELM includes a cascade circuit of an FIR filter FIR3 of a filter coefficient "1" having M (M=32, for example) delay stages DLY and an adder ADD, an averaging circuit AVR3 for averaging its average and a thin-out circuit (M: 1) for picking up and outputting every M data of the averaging circuit AVR3.

The phase advance compensation circuit PGC is constituted by a digital filter for executing an operation expressed by a transmission function $(1+S1/\omega d)/(1+S1/m\cdot\omega d)$ and the advance of the phase can be increased by setting that increases a denominator. Here, $\omega d$ can be expressed by $\omega d=3\times2\cdot\pi\cdot fvcm$ when the frequency band of the voice coil motor is expressed by fvcm. The phase advance compensation portion PGC is disposed so as to suppress the rise of the gain in the proximity of 50 kHz in the frequency-gain characteristics of the motor drive circuit 200. The reason is explained in the following.

Figure 5:
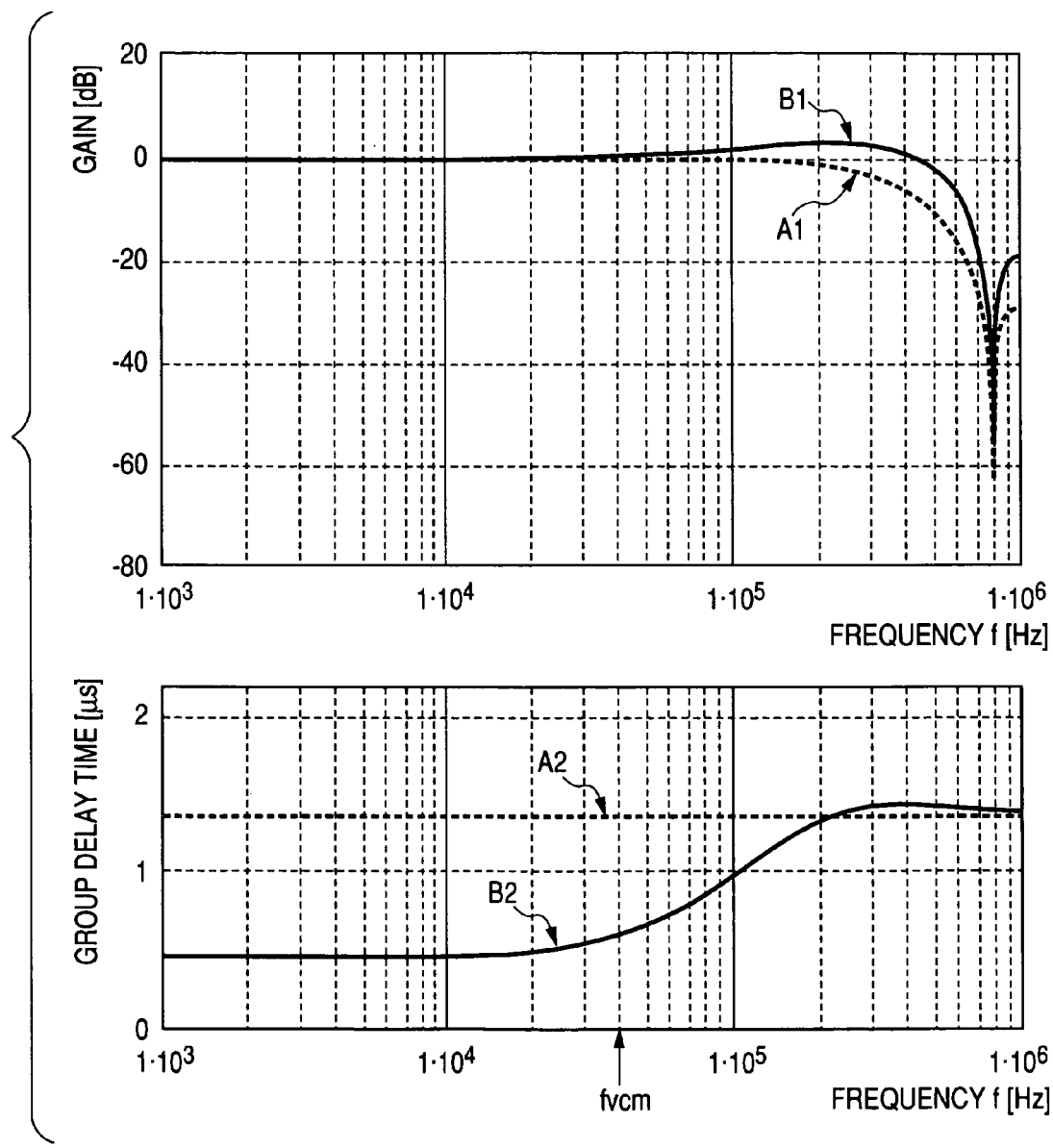
FIG. 5 is a graph showing frequency characteristics of the decimation filter.
Figure 6:
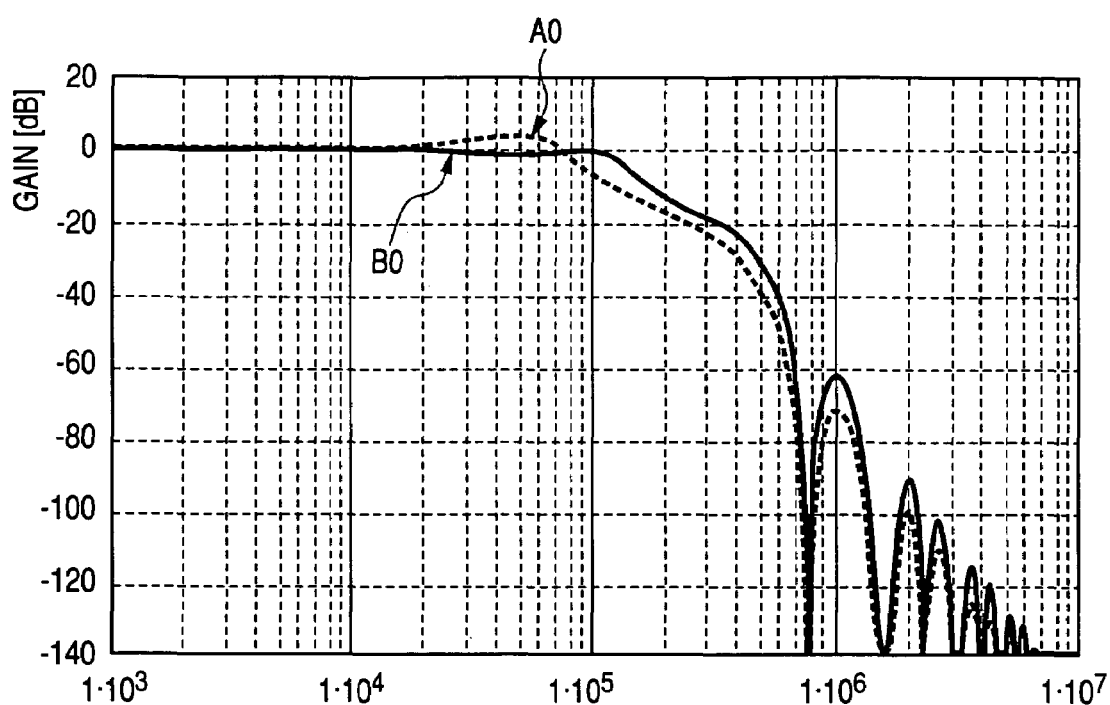
FIG. 6 is a graph showing frequency-gain characteristics of the motor drive circuit in the embodiment.

FIG. 5 shows the frequency characteristics of the decimation filter and FIG. 6 shows the frequency-gain characteristics of the motor drive circuit 200 of the embodiment. When the decimation filter not having the phase advance compensation portion PGC is used, the digital filter has the low-pass filter characteristics and the delay occurs. Therefore, the frequency characteristics of the gain and the group delay time become those indicated by dotted lines A1 and A2 shown in FIG. 5, so that gain peaking occurs in the proximity of 50 kHz in the frequency characteristics of the motor drive circuit 200 as indicated by dotted line A0 in FIG. 6.

When the decimation filter having the phase advance compensation portion PGC is used, on the other hand, the characteristics become those indicated by solid lines B1 and B2 in FIG. 5 and gain peaking does not occur in the frequency characteristics of the motor drive circuit 200 as indicated by solid line B0 in FIG. 6.

Figure 7:
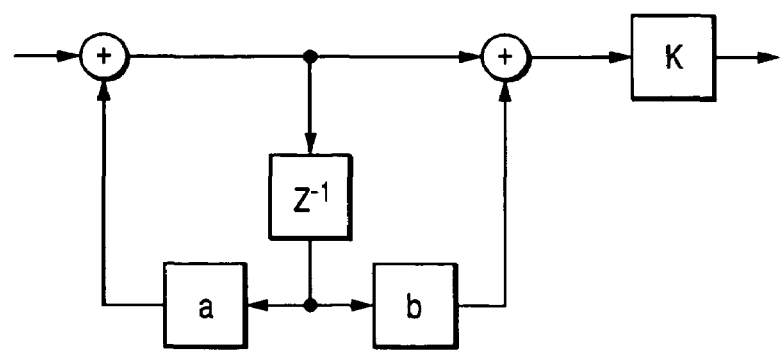
FIG. 7 is a structural view showing an equivalent circuit of a digital filter that constitutes a phase advance compensation portion PGC and a phase compensation circuit 223.

Here, the phase advance compensation portion PGC and the phase compensation circuit 223 can be constituted by a digital filter having an equivalent circuit shown in FIG. 7 and the transmission characteristics can be expressed by the equation $Ki'=(1+bz^{-1})/(1-az^{-1})$. The PI type controller can be expressed by the equation $Ki/s+Kp$ including the terms of Ki and Kp and can be changed in the following way.

$$Ki/s + Kp = Ki/s(1 + Kp\pi s/Ki)$$
$$= Ki/s(1 + s\pi KP/Ki)$$

It can be understood that this equation has the same form as the equation described inside the block of the phase compensation circuit 223 shown in FIG. 2, that is, $Ki/s(1+s\pi L/RL)$. The parameters "K", "a" and "b" in FIG. 7 are set in the phase compensation circuit 223 of the motor drive circuit of the embodiment in FIG. 2 so that $Ki/s(1+s\pi Kp/Ki)$ and $Ki/s(1+s\pi L/RL)$ are equal to each other.

Next, the PWM pulse generation circuits 225 and 226 in the motor drive circuit of this embodiment will be explained Each PWM pulse generation circuit 225 and 226 is a circuit including a counter and a comparator and corresponds to a triangular wave generation circuit in an analog type drive control circuit. The count values FCNT and −FCNT of the PWM pulse generation circuits 225 and 226 are given as 7-bit binary codes designating the pulse width from the $\Sigma\Delta$ type modulation circuit 224 and the count operation is made at a clock $\phi 0$ of 50 MHz so that the output changes when the count value is reached.

Moreover, in this embodiment, the 7-bit count value is given in the cycle of 780 kHz from the $\Sigma\Delta$ type modulation circuit 224 to the PWM pulse generation circuits 225 and 226 on one hand and the PWM pulse generation circuits 225 and 226 are constituted in such a fashion that either one of the counters consecutively outputs the fixed value of the high or low output even when the count values FCNT and −FCNT are given to the PWM pulse generation circuits 225 and 226, on the other hand. Such operations of the PWM pulse generation circuits 225 and 226 will be explained with reference to FIG. 8.

Figure 8:
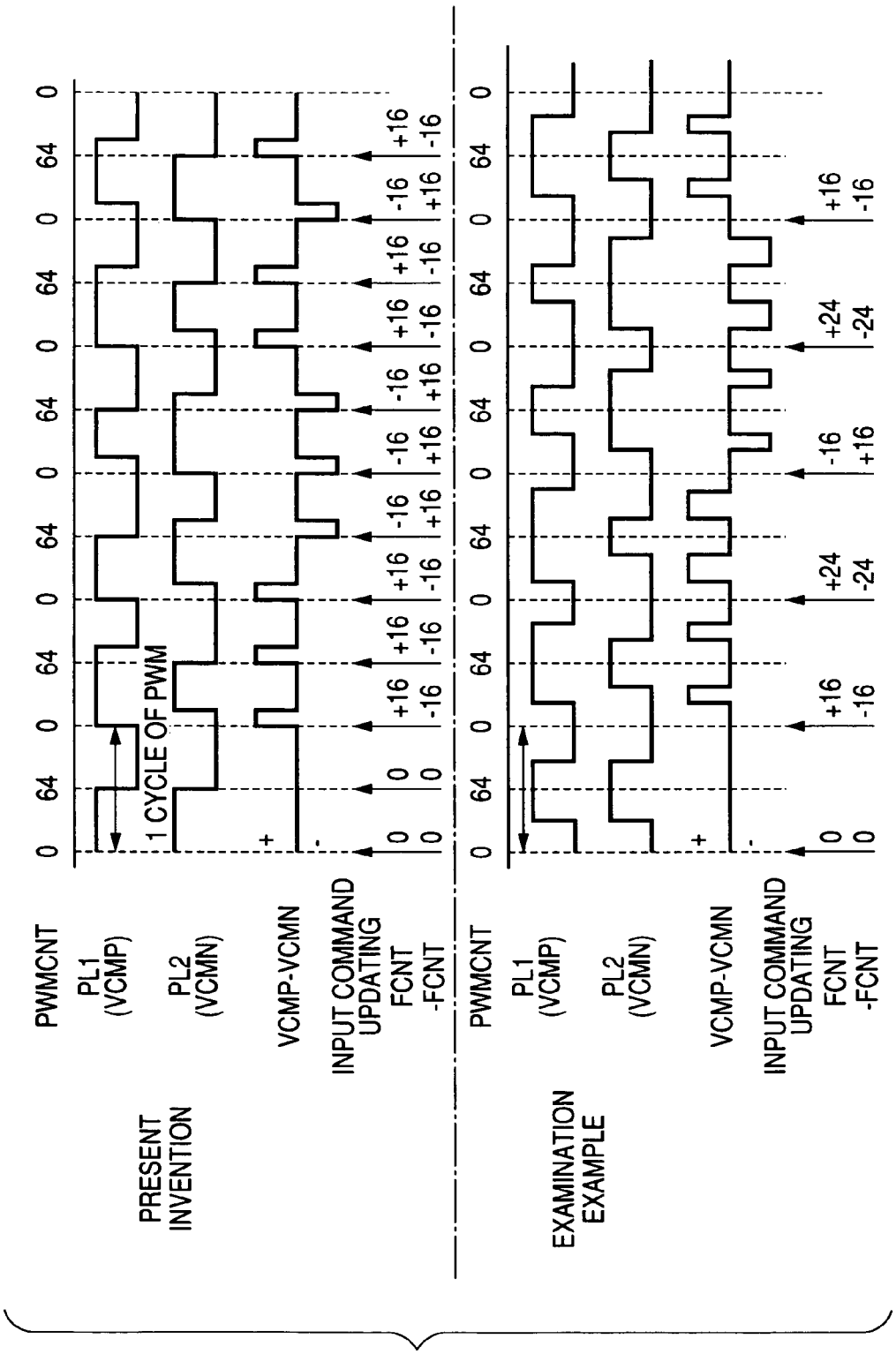
FIG. 8 is a timing chart showing an operation example in the motor drive circuit in the embodiment.

Referring to FIG. 8, PWMCNT represents a count value of a virtual counter that conducts a count-up operation from "0" at a clock $\phi 0$ of 50 MHz simultaneously with the input command of the count values FCNT and −FCNT, PL1 represents a drive control signal (PWM drive pulse) supplied from the PWM pulse generation circuit 225 to the output driver 211 and PL2 represents a drive control signal (PWM drive pulse) supplied from the PWM pulse generation circuit 226 to the output driver 212. PL1 and PL2 are outputted from the drivers 211 and 212 and PWM drive both ends of the coil of the motor. The drive voltages VCMP and VCMN at both ends of the motor switch the GND level and the power source voltage VDD in synchronism with PL1 and PL2, respectively. VCMP-VCMN represents the voltage applied across both ends of the coil of the motor.

As can be seen from FIG. 8, the PWM drive pulses PL1 and PL2 in this embodiment are fixed in one of the half cycles of one cycle. In other words, they are alternately held at the high or low level in every half cycle. As the mode of the operation of the counter in PWM driving, the pulses PL1 and PL2 may well be kept at the high level for the period corresponding to the input command value in one cycle as shown in the lower half of FIG. 8 but when either one of the pulses is fixed and only the other is controlled by the input command value in the half cycle as in this embodiment, the value VCMP-VCMN of the voltage between both ends of the coil can be updated in every half cycle of the PWM drive pulses PL1 and PL2. Consequently, both apparent resolution of PWM modulation and current control accuracy can be improved. Incidentally, which of PL1 and PL2 is fixed is judged depending on the polarity of FCT and in which of the former and latter halves PWMCNT exists.

This embodiment includes the zone in which the output levels of the pulses PL1 and PL2 are coincident and the zone in which they are not coincident, and the non-coincident zone and the coincident zone are aligned in this order with the timing at which the counter value is updated being the starting point. Consequently, the ripple current of the driving current due to PWM can be reduced and high precision control becomes possible at the time of track follow at which the absolute value of the FCNT value becomes small. Furthermore, because the polarity of PL1 and PL2 is switched at the timing of duty =50% at FCNT=0 in this embodiment, the zero-cross distortion due to the delay time and the transition time of the output driving stage does not occur.

More concrete definition of the functions of PL1 and PL2 of the X-bit modulator in the embodiment described above is as follows.

(i) when FCNT (command value of PL1)=FCNT (command value of PL2)=0:

If $0<=PWMCNT<[2^{\wedge}(X-1)]-1$, then PL1=H, PL2=H

If $[2^{\wedge}(X-1)]<PWMCNT<=[2^{\wedge}X]-1$, then PL1=L, PL2=L (ii) when FCNT=+N, −FCNT=−N (0<N=2^(X−1)−1) input:
If 0<=PWMCNT<N−1, then PL1=H, PL2=L
If N<=PWMCNT<[2^(X−1)]−1, then PL1=H, PL2=H
If [2^(X−1)]<PWMCNT<[2^(X−1)]+N−1, then PL1=H, PL2=L
If [2^(X−1)]+N<PWMCNT<=[2^X]−1, then PL1=L, PL2=L
(iii) when FCNT=−N, −FCNT=+N (0<N=2^(X−1)−1) input:
If 0<=PWMCNT<N−1, then PL1=L, PL2=H
If N<=PWMCNT [2^(X−1)]−1, then PL1=H, PL2=H
If [2^(X−1)]<PWMCNT<[2^(X−1)]+N−1, then PL1=L, PL2=H
If [2^(X−1)]+N<PWMCNT<=[2^X]−1, then PL1=L, PL2=L.

Figure 10:
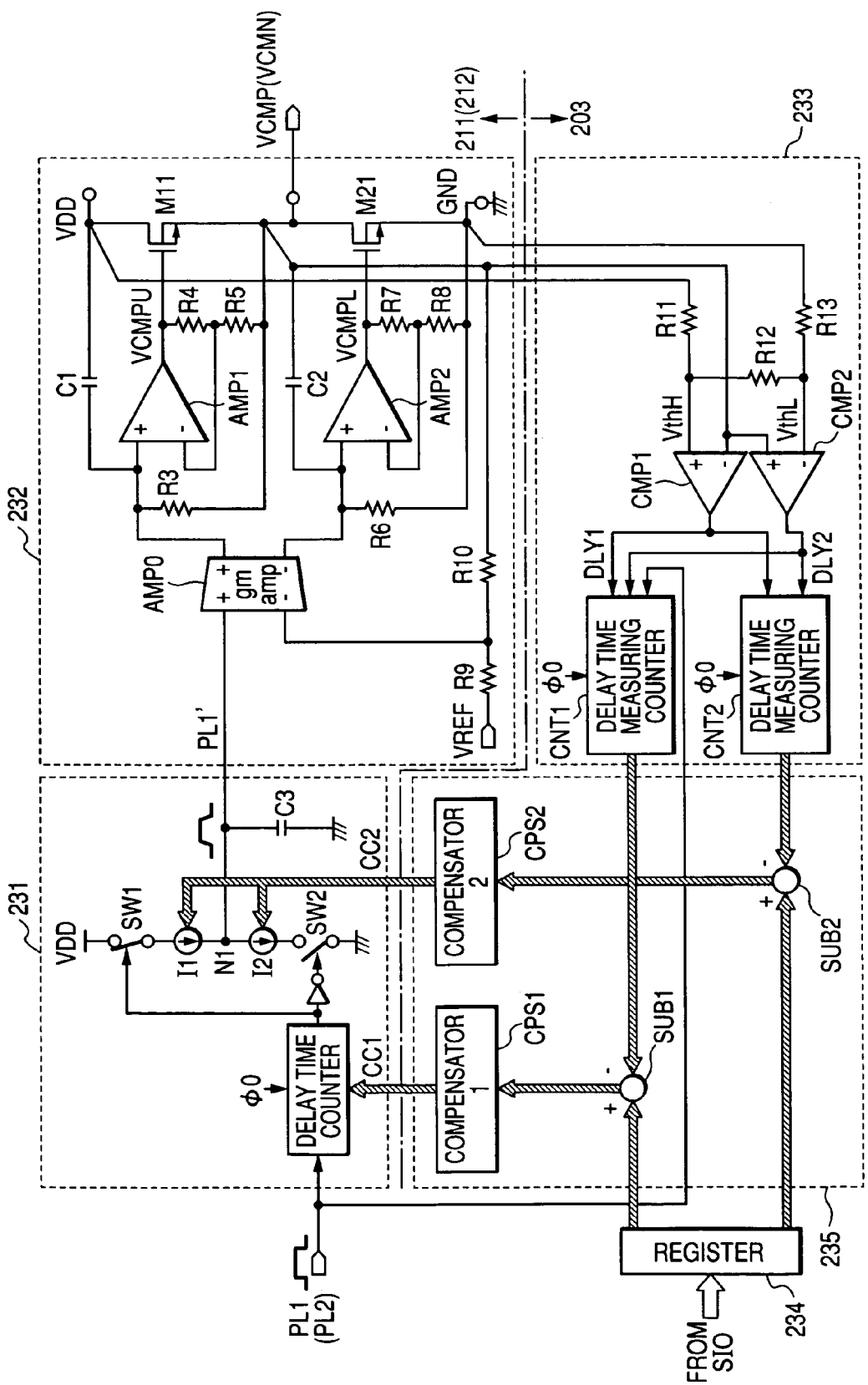
FIG. 10 is a structural view showing a concrete example of an output driver and an output control circuit that constitute the voice coil motor drive circuit in the embodiment.
Figure 11:
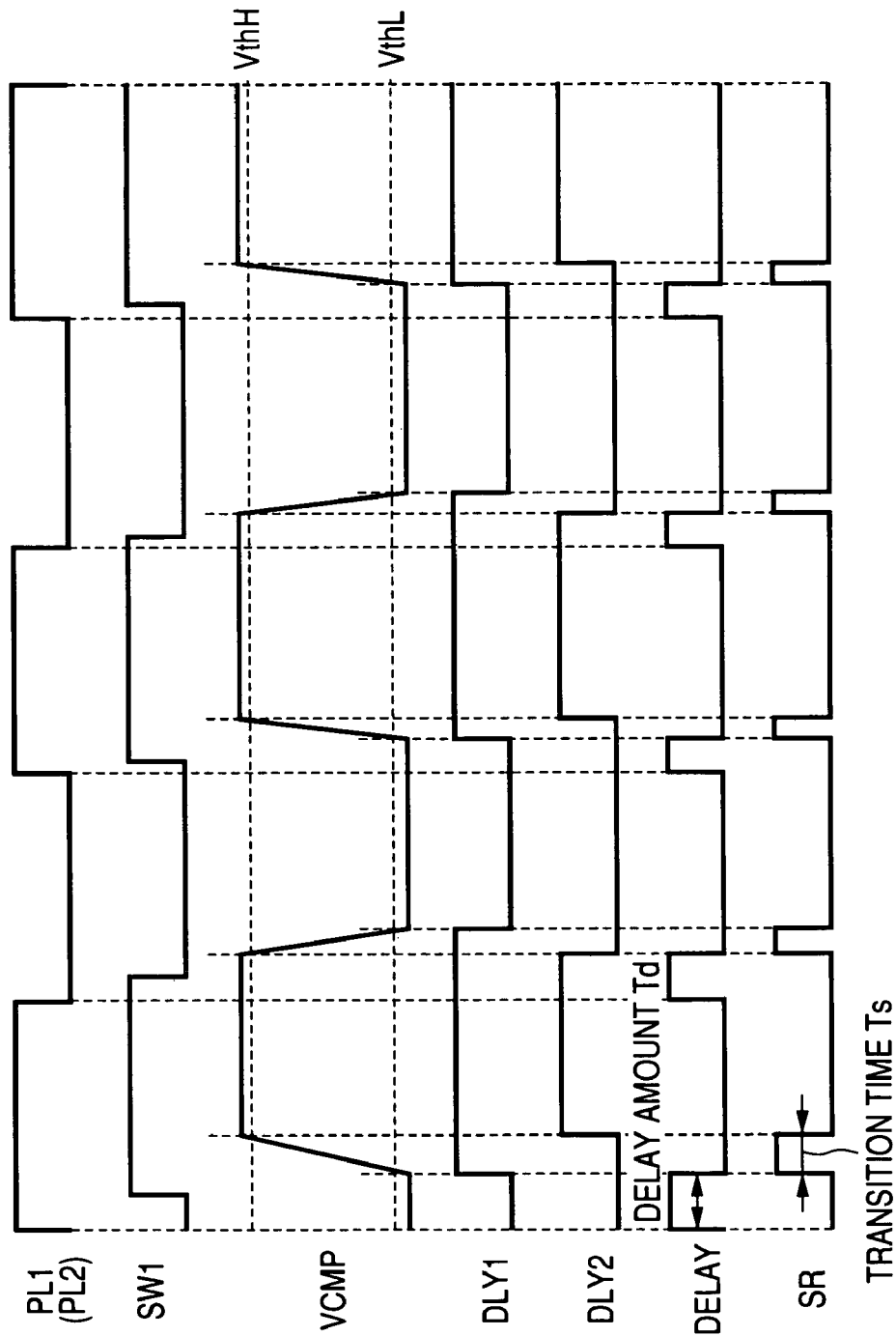
FIG. 11 is a timing chart showing an operation example of the output driver of the voice coil motor drive circuit in the embodiment.

Next, a concrete example of the output drivers 211 and 212 each having the current detection circuit in the motor drive circuit of this embodiment and their concrete operations will be explained with reference to FIGS. 10 and 11. FIG. 10 shows the construction of the driver 211 on the P side among the output drivers 211 and 212. Since the output driver 212 has the same construction as the output driver 211, its illustration and explanation will be omitted.

The output driver 211 according to this embodiment includes a waveform regulation portion 231 for regulating a waveform on the basis of the switching timing of the drive pulse PL1 supplied from the PWM pulse generation circuit 225 and the control signal supplied from the output control circuit 203 and an output drive portion 232. The output control circuit 203 includes an accounting portion 233 for detecting a delay time and a transition time of the output voltage VCMP from the power source voltage VDD of the output driver 211 and the output voltage VCMP, a register portion 234 for holding control information received from the controller 320 through the serial port (SIO) 201 and a control signal generation portion 235 for generating a control signal for the waveform regulation portion 231 on the basis of the control information held by the register portion 234 and the detection signal from the counting portion 233.

As shown in FIG. 10, the output drive portion 232 of the output driver includes output MOS transistors M11 and M21 that are connected in series between the power source voltage terminal VDD and the ground point and apply the driving voltage VCMP to one of the terminals of the coil to flow a current, error amplifiers AMP1 and AMP2 for driving the gate terminals of M11 and M21, and a voltage input-current output type differential amplification circuit (hereinafter called "gm amplifier") AMP0 for inputting the signal from the waveform regulation portion 231 and the voltages obtained by voltage dividing the input signals of the output voltage VCMP by resistors R9 and R10 and generating the input signals of the coil driving error amplifiers AMP1 and AMP2.

Voltages obtained by voltage dividing the own output voltages of the error amplifiers AMP1 and AMP2, that is, the voltages of the output MOS transistors M11 and M21 and the voltages obtained by voltage dividing the gate voltages of M11 and M21 by the resistors R4 and R5 or R7 and R8 are applied to the inversion input terminals of the error amplifiers AMP1 and AMP2. JP-A-2003-52194 discloses a similar circuit technology to the drive circuit of the output driver having such a construction and the explanation of the detail will be omitted because it is not relevant to the gist of the invention.

The counting portion 233 includes a voltage comparator CMP1 for inputting a reference potential a little lower than the output voltage VCMP of the output drive portion 232 and the power source voltage VDD, a voltage comparator CMP2 for inputting a reference potential a little higher than the output voltage VCMP of the output drive portion 232 and the ground potential GND, a counter CNT1 for detecting a delay time Td (see FIG. 11) of the output voltage VCMP from the output DLY1 of the voltage comparator CMP1 or the output DLY2 of the voltage comparator CMP2, and the PWM driving pulse PL1 (PL2), and a counter CNT2 for detecting a transition time Ts of the output voltage VCMP from the output DLY1 of the voltage comparator CMP1 and the output DLY2 of the voltage comparator CMP2.

The control signal generation portion 235 includes subtracters or digital comparators SUB1 and SUB2 for calculating the difference between the control information held by the register portion 234 and the detection signal from the counting portion 233 and compensators CPS1 and CPS2 for generating control codes CC1 and CC2 corresponding to the difference and outputting them to the waveform regulation portion 231 described above. The compensators CPS1 and CPS2 use digital filters.

The waveform regulation portion 231 includes a delay counter DLC for delaying the PWM drive pulse PL1 in accordance with the control code CC1 from the compensator CPS1, a pair of constant current sources I1 and I2 connected in series with each other, switches SW1 and SW2 connected in series with the constant current sources I1 and I2, respectively, and a capacitance device C3 interposed between the junction node N1 between the current sources I1 and I2 and the ground point. The current sources I1 and I2 are constituted in such a fashion that their current values are changed in accordance with the control code CC2 from the compensator CPS2 of the control signal generation portion 235 described above. The switches SW1 and SW2 are controlled in such a fashion that either one of them is turned ON. When the switch SW1 is turned ON, the current source I1 charges the capacitance device C3 and the output voltage PL1' rises. When the switch SW2 is turned ON, the current source I2 discharges the capacitance device C3 and the output voltage PL1' falls. The speed of this change is controlled by the current values of the current sources I1 and I2 and the change speed of the output (slope), that is, the transition time, can be regulated.

As described above, the output driver 211 (212) according to the embodiment is controlled in the waveform regulation portion 231 on the basis of the switching timing of the drive pulse PL1 (PL2) supplied from the PMW pulse generation circuit 225 (226) and the count result by the counting portion 233 and feedback is applied so that the count value is coincident with the set value from the controller. As shown in FIG. 11, therefore, the delay time Td and the transition time Ts gradually converge to the set values. Incidentally, the changing speed (slope) of the output is controlled through switching of the current values I1 and I2 in this embodiment but the transition time Ts may be regulated by directly controlling the through-rate of the gm amplifier AMP0 by omitting the through-rate regulation circuit including SW1, SW2, I1 and I2.

The following advantages can be acquired when the output driver 211 (212) of this embodiment is applied.

In the magnetic disk storage apparatus, the signal wires are used to connect the voice coil motor 108 to the motor drive IC (200) and the read/write IC mounted to the arm 106 supporting the head 104 to the signal processing IC (110) as shown in FIG. 1. Printed wiring cables (see FIG. 12) called "FPC" are generally employed for the connection and are branched at the intermediate parts for the connection with the respective components. Therefore, the wires for connecting the voice coil motor 108 to the motor driving IC (200) and the wires for connecting the read/write IC to the signal processing IC (110) are arranged adjacent to one another.

Figure 12:
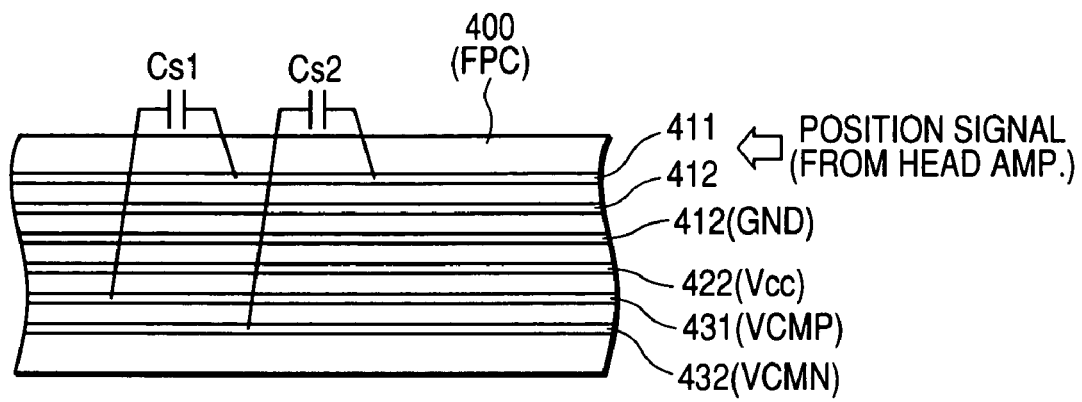
FIG. 12 is an explanatory view showing in magnification a structural example of a cable for connecting the head side to the control apparatus side in the magnetic disk storage apparatus to which the invention is applied.

The positioning signal of the head read out from the magnetic head 104 is amplified by the pre-amplifier inside the read/write IC on the arm 106 and is supplied to the signal processing circuit 110 through the signal line 411 of the flexible cable 400. The supply of the drive voltages (VCMP and VCMN) from the motor drive circuit 200 having the output driver of this embodiment to the voice coil motor 108 is made through the signal lines 431 and 432 of the same cable. Therefore, floating capacitances Cs1 and Cs2 existing between the signal line 411 and 431 and 432 of the flexible cable (FPC) cause coupling of the switching noise of the driving voltages VCMP and VCMN of the voice coil motor with the position signal and are likely to deteriorate positioning control accuracy, as shown in FIG. 12, for example.

A high speed operation is required at the time of head seek to the magnetic disk and the driving current Ivcm of the voice coil motor becomes great (maximum about 2 A) but read accuracy of the positioning signal is not so severe as at the time of track follow. At the time of track follow of the head, on the contrary, the driving current Ivcm itself of the voice coil motor is small (dozens of mA) but read accuracy of the positioning signal is severe to keep the ON track state. Because the positioning signal and the read data signal are alternately outputted in the time series through the same wire at the time of track follow, superposition of the coupling noise invites deterioration of the error rate. Furthermore, the noise with which the positioning signal couples is likely to become greater when the coil drive voltages VCMP and VCMN simultaneously change in the same direction.

Figure 13:
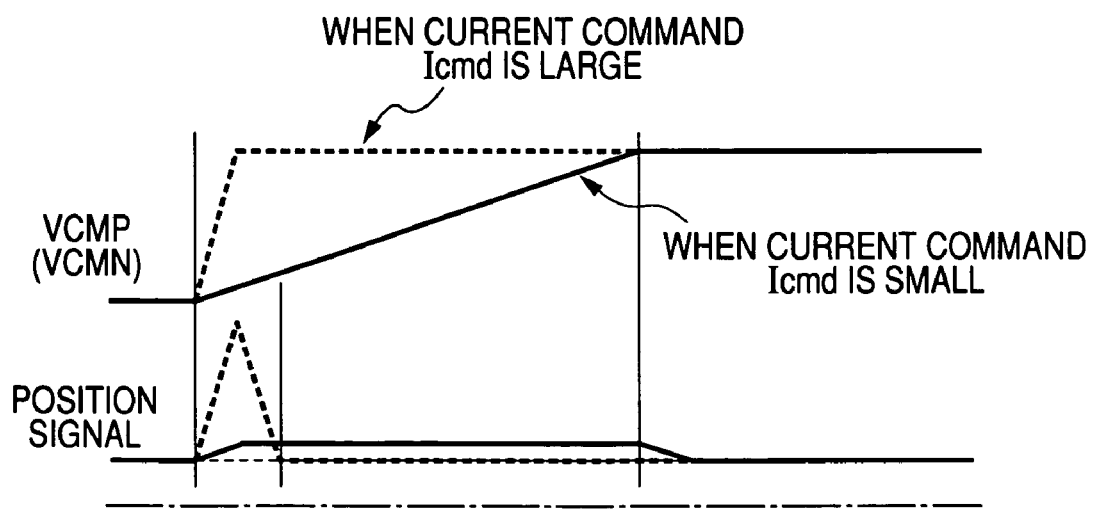
FIG. 13 is a waveform diagram showing influences of a signal transmitted through the cable.

Therefore, in order to assign a priority for the reduction of the switching loss at the time of head seek at which the current command value Icmd is great, the changing speeds (slopes) of the coil driving voltages VCMP and VCMN of the voice coil motor are rendered sharp as shown in FIG. 13. To assign the priority for suppression of the coupling noise at the time of track follow at which the current command value Icmd is small, the changing speeds (slopes) of the driving voltage VCMP and VCMN of the voice coil motor are rendered gentle. Owing to switching of the slope, a practical VCM driver capable of reducing the occurrence of the coupling noise in the cable while suppressing the increase of power consumption of the apparatus can be accomplished. Incidentally, switching of the slope of the driving voltage at the time of head seek and track follow may be decided in accordance with the absolute value of the driving current command value Icmd of the voice coil motor or may be made by utilizing the mode switch signal of the positioning control system.

Next, an example of the current detection circuit for detecting the current flowing through the coil of the voice coil motor will be explained. The voice coil motor drive circuit of the embodiment shown in FIG. 1 can monitor the current by detecting the voltage drop occurring in the sense resistor connected in series with the coil of the motor in the same way as the drive circuit of the prior art. In this embodiment, however, coil current detection circuits are provided to the drivers 211 and 212. Each coil current detection circuit reproduces a current flowing through the output MOS transistors (M11, M21, etc in FIG. 10) of the drivers 211 and 212 by the current mirror system, causes the current so reproduced to flow through a sense resistor disposed independently of the coil of the motor and monitors the current by detecting the voltage drop occurring in this resistor.

Figure 15:
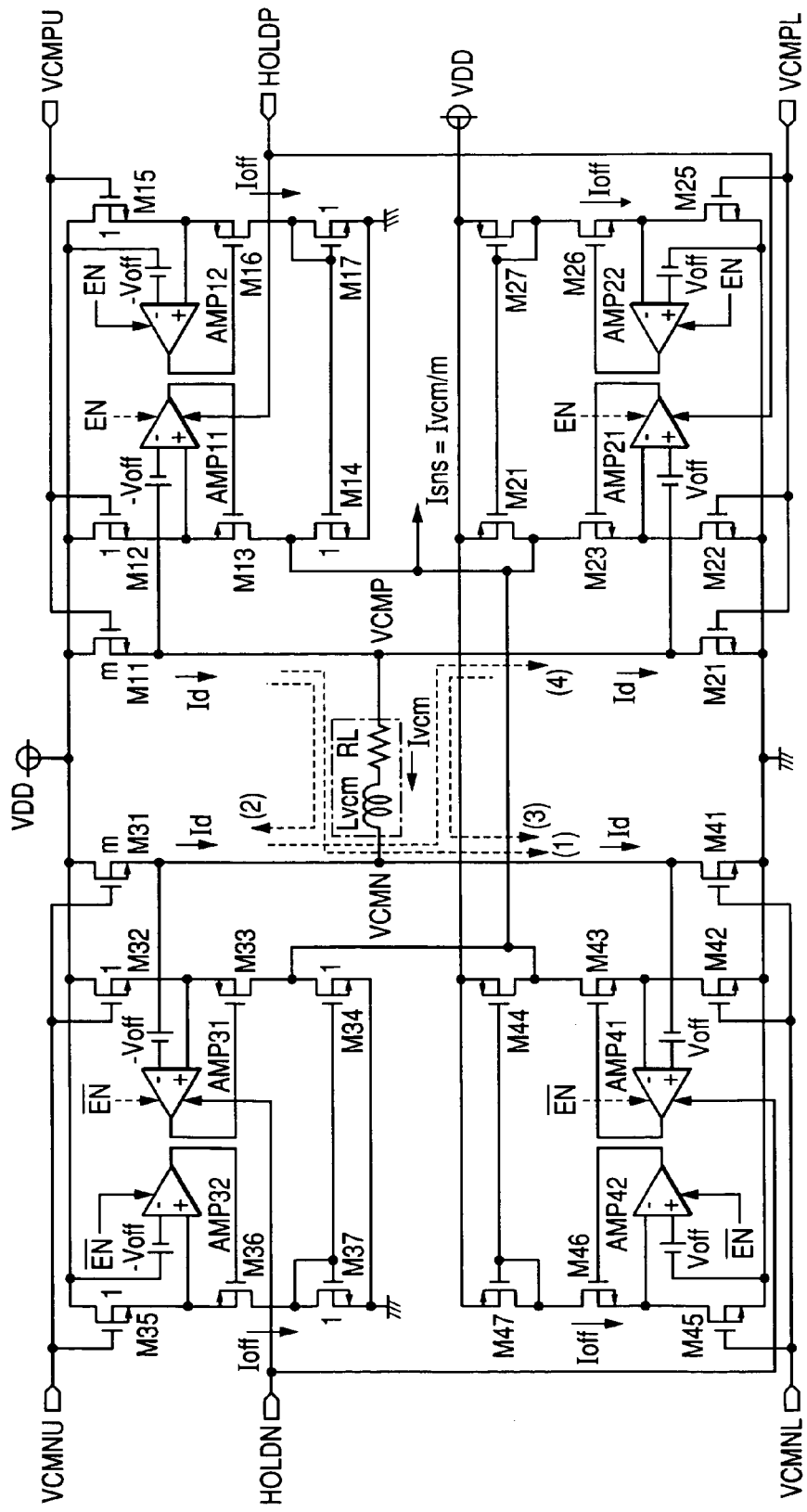
FIG. 15 is a structural view showing a concrete example of the current detection circuit in the voice coil motor drive circuit in the embodiment.

FIG. 15 shows a concrete circuit example of the coil current detection circuit.

FIG. 15 shows an H bridge type motor circuit for supplying a current to the coil Lvcm from the output MOS M11, M21, M31 and M41 and drives the coil. Symbol Lvcm represents the coil of the voice coil motor and RL represents a parasitic resistance component of the coil but is not the sense resistor Rsns. FIG. 15 does not show the sense resistor Rsns. FIG. 15 does not show the gm amplifier AMP0 and the error amplifiers AMP1 and AMP2 that are shown in FIG. 10, either. Referring to FIG. 15, the circuit shown on the right side of the coil Lvcm is a current detection circuit corresponding to the driver 211 on the upper side (P side) and the circuit shown on the left side of the coil Lvcm is a current detection circuit corresponding to the driver 212 on the lower side (N side).

The MOS transistors M11 and M21 to the drain terminals of which one of the ends of the coil Lvcm (right side in the drawing) is connected are the output MOS transistors of the driver 211 on the upper side (P side) and the gates of these output MOS transistors M11 and M21 are driven by the output voltages VCMPU and VCMPL of the error amplifiers AMP1 and AMP2 shown in FIG. 10. M31 and M41 are the output MOS transistors of the driver 212 on the lower side (N side) and the gates of these output MOS transistors M31 and M41 are driven by the output voltages VCMNU and VCMNL of the error amplifiers (corresponding to AMP1 and AMP2) constituted in the same way as the driver shown in FIG. 10.

The coil current detection circuit of this embodiment includes MOS transistors M12, M22, M32 and M42 which are arranged in parallel with the output MOS transistors M11, M21, M31 and M41, respectively, to the gate terminals of which the same voltage as the voltages VCMPU, VCMPL, VCMNU and VCMNL is applied and which monitor the drain currents. The size (gate width) of M11 and M12, M21 and M22, M31 and M32 and M41 and M42 is set to m:1 so that a drain current of 1/m of the drain current flowing through M11, M21, M31 and M41 flows through M12, M22, M32 and M42.

The monitor circuit having the same construction including the MOS transistor M12, M22, M32 and M42 is provided to each output MOS transistor M11, M21, M31 and M41 as can be understood from FIG. 15. Therefore, the monitor circuit corresponding to the output MOS transistor M11 will be hereinafter explained and the explanation of the monitor circuits corresponding to M21, M31 and M41 will be omitted.

MOS transistors M13 and M14 are connected in series with the monitor MOS transistor M12 and an MOS transistor M15 to the gate terminal of which the same voltage as the voltages VCMPU, VCMPL, VCMNU and VCMNL is applied, which has the same size as M11 and through which the same current flows is provided to the MOS transistor M12. MOS transistors M16 and M17 are connected in series with this MOS transistor M15. The drain and the gate of M17 among them are coupled in diode connection and the gate terminals of M17 and M14 are mutually connected to thereby constitute a current mirror circuit The MOS transistors M17 and M14 have the same size.

The output voltages of error amplifiers AMP11 and AMP 12 are applied to the gate terminals of the MOS transistors M13 and M16 described above, respectively. The source voltage of the monitor MOS transistor M12 is applied to the non-inversion input terminal of the error amplifier AMP11 and a voltage lower by a predetermined voltage Voff than the source voltage of the driving MOS transistor M11 is applied to its inversion input terminal. Consequently, the MOS transistor M12 is controlled by the operation of the negative feedback loop constituted by the error amplifier AMP11 and MOS M13 so that its source voltage attains a voltage lower by Voff than the source voltage of the driving MOS transistor M11. Because of this operation, the operating condition of the driving MOS M11 is perfectly coincident with the operating condition of the monitor MOS M12 and the current mirror having high accuracy can be formed as long as the MOS transistors operate in the ON resistance region.

On the other hand, the source voltage of the MOS transistor M15 is applied to the non-inversion input terminal of the error amplifier AMP 12 and a voltage lower by a predetermined voltage (offset voltage) Voff than the power source voltage VDD is applied to the inversion input terminal. Consequently, the MOS transistor M16 is controlled by the operation of the negative feed loop constituted by the error amplifiers AMP12 and MOS M16 so that its source voltage attains a voltage lower by Voff than the power source voltage VDD. The drain current of this MOS transistor M16 is caused to flow through the MOS transistor M17 and is transferred to the MOS transistor M14 by the current mirror. As a result, the difference between the drain current flowing through the MOS transistor M13 and the drain current flowing through M14 is outputted as the detection current Isns and this current is caused to flow through the sense resistor Rsns (see FIG. 2).

The reason why the error amplifier AMP11 and the MOS transistor M13 are provided so as to bring the source voltage of M12 to a voltage lower by Voff than the source voltage of M11 is because the source voltage of the output transistor M11 becomes higher than the power source voltage VDD and the drain current in the opposite direction can flow during the power regeneration period when the coil Lvcm of the motor is PWM driven but the monitor MOS transistor M12 cannot cause the drain current in the opposite direction to flow because of its circuit construction. The offset voltage Voff is set so that the opposite current cannot flow through M12 under the state where the drain current in the opposite direction flows through the output MOS transistor M11 during the power regeneration period when PWM driving is made. In consequence, the predetermined current Ioff flows through the monitor MOS transistor M12 when the drain current of the output MOS transistor M11 becomes zero, too.

However, when the current of the monitor MOS transistor M12 is caused to flow as such through the sense resistor Rsns, the excessive current (offset current Ioff) resulting from the offset voltage Voff adds and the correct detection current can not be caused to flow. Therefore, this offset is cancelled by the steps of generating only the offset current Ioff resulting from the offset voltage Voff by M15, M16 and the error amplifier AMP12, transferring it to the MOS transistor M14 by the current mirror, subtracting the offset current Ioff flowing through the MOS transistor M14 from the drain current flowing through the MOS transistor M13 and outputting the balance as the detection current.

In the coil current detection circuit of this embodiment, further, the error amplifiers AMP11, AMP12 to AMP41 and AMP42 are activated at a predetermined timing by enable signals EN and /EN so as to prevent the detection currents from being simultaneously outputted from a plurality of detection circuits and to prevent the detection of the wrong coil current. This operation will be explained next with reference to FIGS. 16 to 18.

Figure 16:
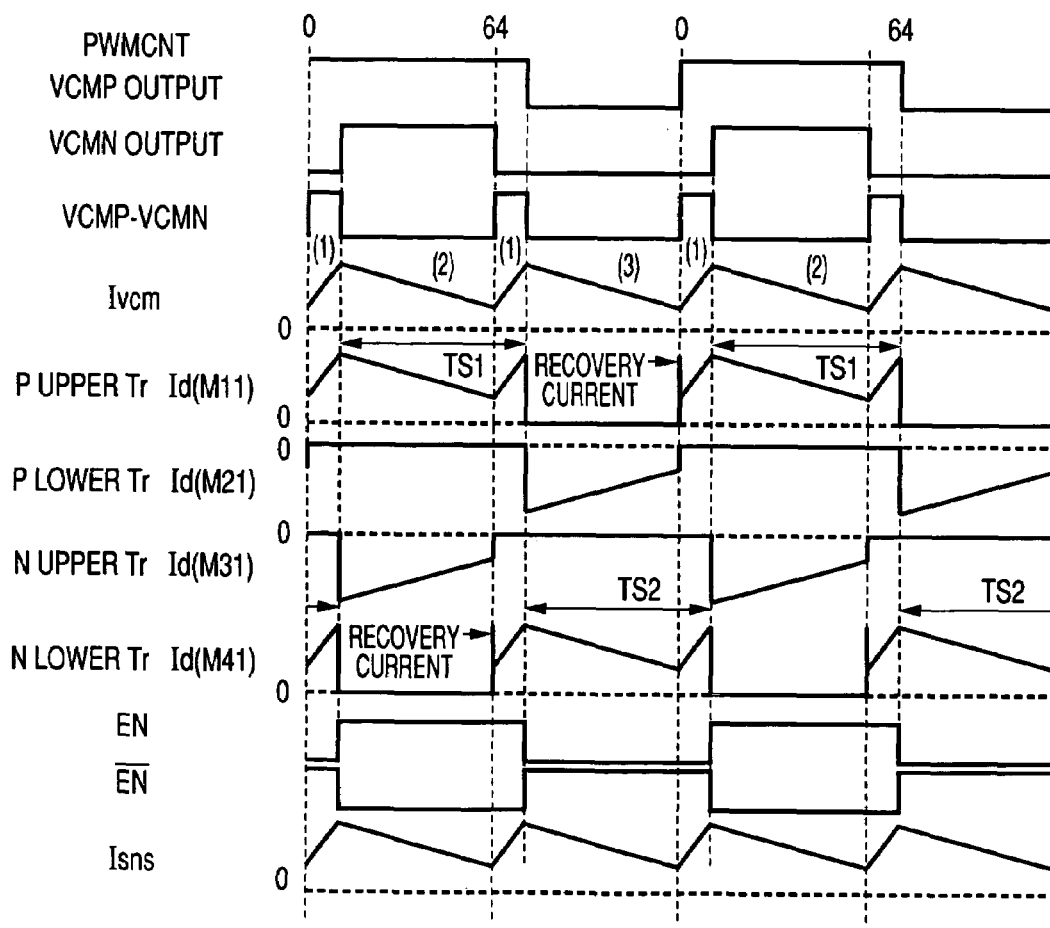
FIG. 16 is a timing chart showing an operation example of the current detection circuit of the embodiment.

FIG. 16 shows the changes of the coil current IVCm, the drain currents Id of M11, M21, M31 and M41, the enable signals EN and /N and the detection current Isns when the output MOS transistors M11, M21, M31 and M41 are subjected to ON/OFF control so that the outputs VCMP and VCMN of the drivers 211 and 212 flow through the coil in the direction indicated by arrows in FIG. 15, that is, from the right to the left in the drawing. Under this control state where the coil current Ivcm flows in the direction of the arrows in FIG. 15, the output MOS transistors M11 and M41 are turned ON during the period of VCMP−VCMN>0 and an effective driving current is allowed to flow through the coil in the direction indicated by the arrow (1) in FIG. 15. Next, the current flows as indicated by the arrow (2) when M41 is turned OFF from ON and M31 is turned ON from OFF while M11 is kept ON.

The effective driving current is again caused to flow through the coil as indicated by the arrow (1) when M41 is turned ON from OFF and M31 is turned OFF from ON while M11 is kept ON, and then the current indicated by the arrow (3) flows when M11 is turned OFF from ON and M21 is turned ON from OFF. Thereafter, the effective driving current again flows as indicated by the arrow (1) when M1 is turned ON from OFF and M21 is turned OFF from ON while M41 is kept ON. However, when the current is switched from (2) to (1) at the time of switch of M41 from OFF to ON and M31 from ON to OFF, too, a recovery current flows momentarily through M31 and M41 and when the current is switched from (3) to (1) at the time of switch of M11 from OFF to ON and M21 from ON to OFF, too, the recovery current flows momentarily through M11 and M21. Therefore, an error develops in the detection of the current of that phase when such a recovery current flows.

In this embodiment, therefore, the amplifiers AMP11 and AMP12 are activated by the enable signals EN and /EN during the TS1 period while the amplifiers AMP41 and MP42 are activated during the TS2 period so as to avoid current detection during the period in which the voltages of the output driving transistors are under transition and to make current detection only from the output driving transistor that is always under the ON resistance state. In this way, the correct current can be detected. Moreover, because the periods TS1 and TS2 have the same time, the detection value on the VCMP side and the detection value on the VCMN side can be averaged and offset and variance of the gain occurring between both detection circuits on the VCMP side and the VCMN side are reduced.

Figure 17:
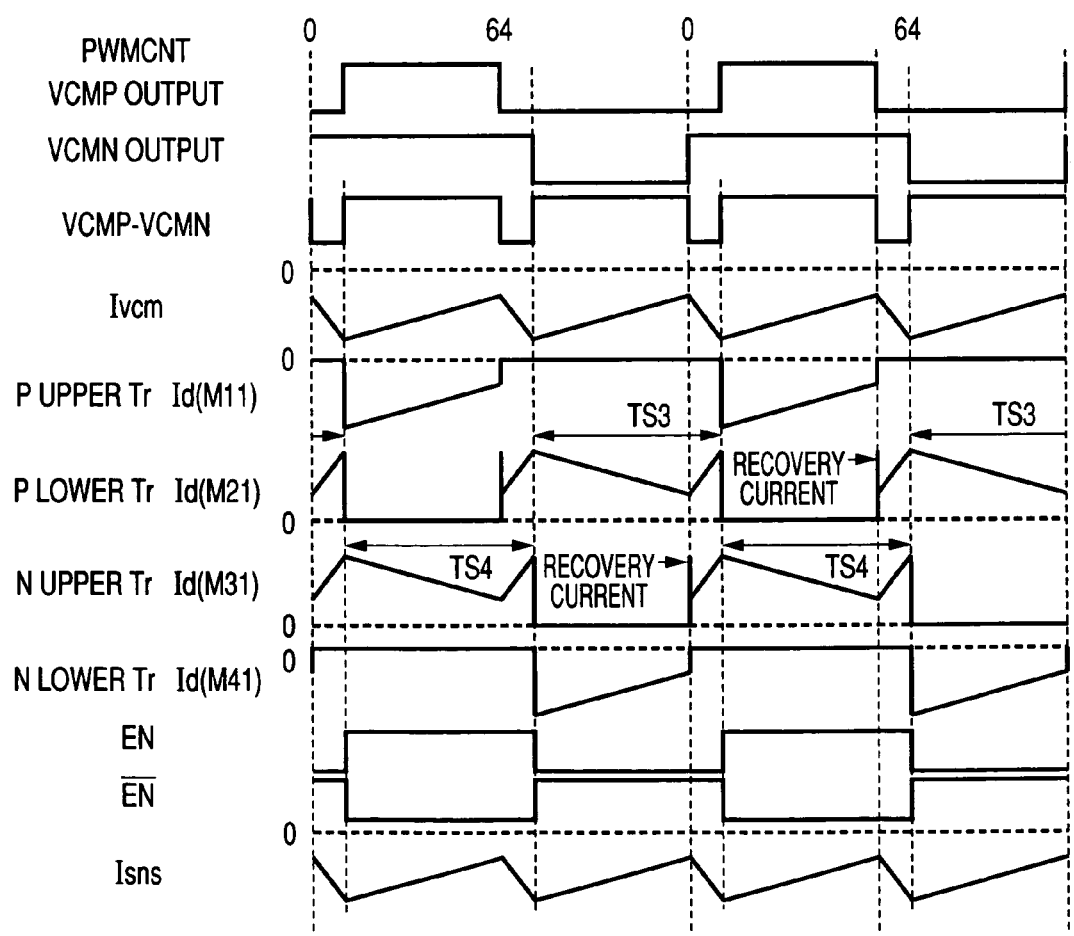
FIG. 17 is a timing chart showing an operation example of the current detection circuit of the embodiment under a different condition.
Figure 18:
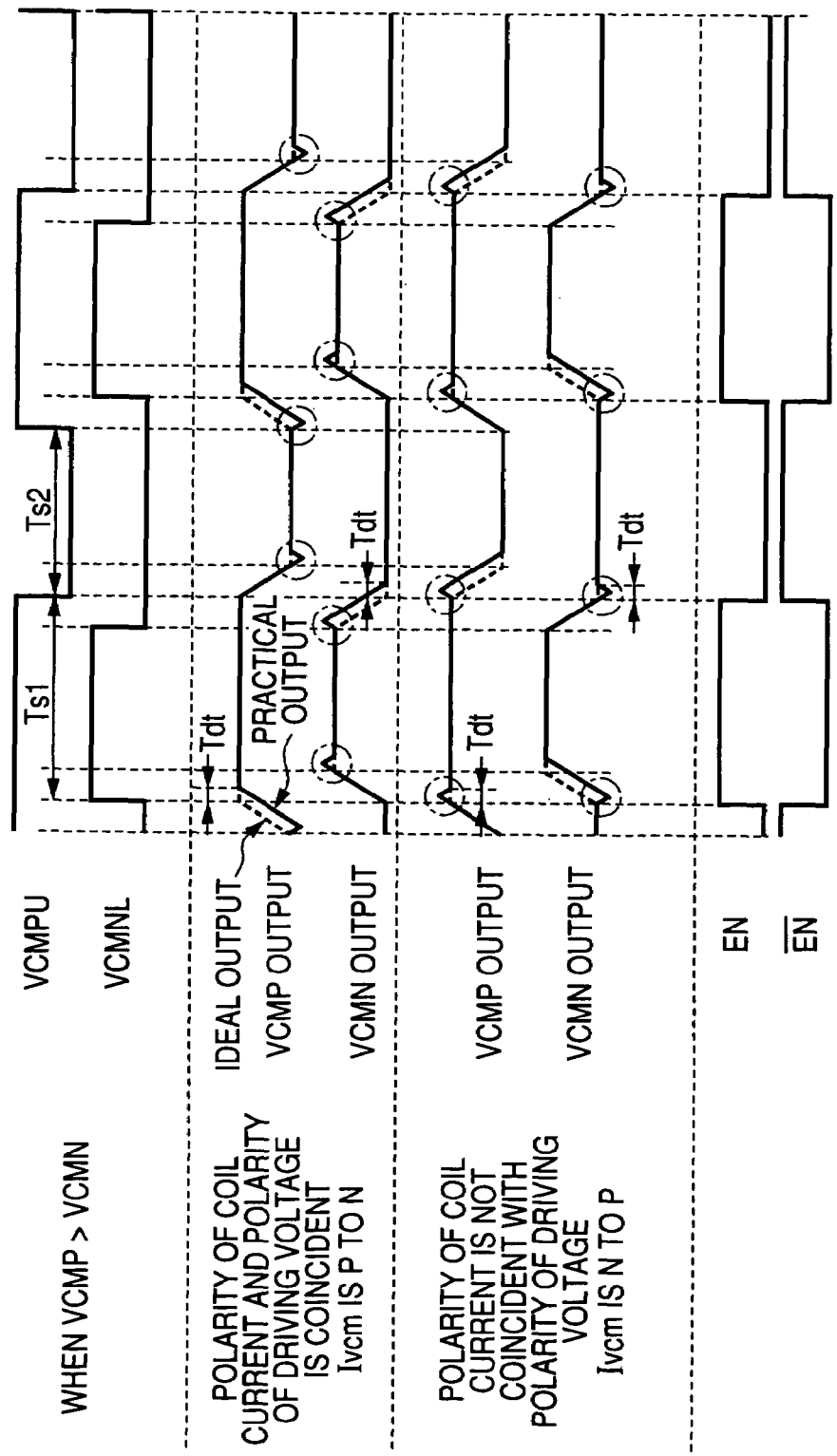
FIG. 18 is a waveform diagram showing an output voltage waveform when the direction of the current of the coil in the current detection circuit of the embodiment is coincident with the polarity of the driving current and an output voltage waveform when they are not coincident.

FIG. 17 shows the changes of the coil current Ivcm, the drain currents Ivcm of M11, M21, M31 and M41, the enable signals EN and /EN and the detection current Isns when the output MOS transistors M11, M21, M31 and M41 are subjected to ON/OFF control so that the outputs VCMP and VCMN of the drivers 211 and 212 flow through the coil in the direction opposite to the direction indicated by arrows in FIG. 15, that is, from the left to the right in the drawing. Under the control state where the coil current Ivcm flows in the direction opposite to the arrows in FIG. 15, the output MOS transistors M31 and M21 are turned ON during the period of VCMP−VCMN<0 and the effective driving current is allowed to flow through the coil in the direction indicated by the arrow (4). However, when M21 is turned ON from OFF and M11 is turned OFF from ON, a recovery current flows momentarily through M11 and M21 and when M31 is turned ON from OFF and M41 is turned OFF from ON, the recovery current flows momentarily through M31 and M41. Therefore, the error develops in the detection of the current of the phase when such a recovery current flows.

In this embodiment, therefore, the amplifiers AMP21 and AMP22 are activated by the enable signals EN and /EN during the TS3 period while the amplifiers AMP31 and MP32 are activated during the TS4 period so as to avoid current detection during the period in which the voltages of the output driving transistors are under transition and to make current detection only from the output driving transistor that is always under the ON resistance state. In this way, the correct current can be detected. Moreover, because the periods TS3 and TS4 have the same time, the detection value on the VCMP side and the detection value on the VCMN side can be averaged and offset and variance of the gain occurring between both detection circuits on the VCMP side and the VCMN side are reduced.

In the current detection circuit of this embodiment, an extremely great penetration current is likely to flow at the time of ON/OFF switch of the output MOS transistors M11, M21, M31 and M41 when the MOS transistor M11 on the upper side and the MOS transistor M21 or M31 and M41 are simultaneously turned ON due to slight fluctuation of the control signals VCMPU to VCMNL. Therefore, the timing of the control signals VCMPU to VCMNL is set so that M11 and M21 or M31 and M41 are not simultaneously turned ON.

When such a circuit arrangement is used, the following phenomenon occurs. Namely, M31 is turned OFF, too, immediately after M41 is turned OFF from ON when the output MOS transistors M11 and M41, for example, are turned ON and the current of FIG. 15 (1) flows through the coil. Therefore, the current flows through the substrate diode of M41 and non-coincident portion appears in the terminal voltages VCMP and VCMN of the coil as indicated by circles in FIGS. 18(c) and (d). However, even when such a current flows and the non-coincident portion appears in VCMP and VCMN, the current can be detected correctly by the circuit shown in FIG. 15 because current detection is basically the one at the time of full ON of the output MOS transistors when the direction of the coil current and the polarity of the driving voltage are coincident. However, a detection error of a certain level occurs when the transition period is slow and the outputs of VCMP and VCMN do not yet finish transition at the starting point of the periods Ts1 and Ts2.

However, because the load as the driving object in the invention is premised on the inductive coil, the phase of the driving current Ivcm of the load coil is retarded in comparison with the difference driving voltage of VCMP−VCMN. Therefore, the polarity of the driving voltage and the driving current inverses for a predetermined time immediately after the polarity of the driving current is switched. When the load is the coil of the voice coil motor, there is the period in which the polarity of the driving voltage and the driving current inverses due to the influences of the back electromotive force B-EMF of the motor. In this polarity inversion period (in which the polarity of the voltage is not coincident with that of the current), the period Tdt (hereinafter called "dead time") shown in FIG. 18 occurs after the transition of the potential of the output stage due to switching of the upper and lower MOS transistors of the output driving stage. Therefore, it is coincident with switching of the enable signal EN as the phase selection signal. It has thus been found that the output MOS transistors are not turned ON and current detection cannot be conducted during the dead time Tdt.

Figure 19:
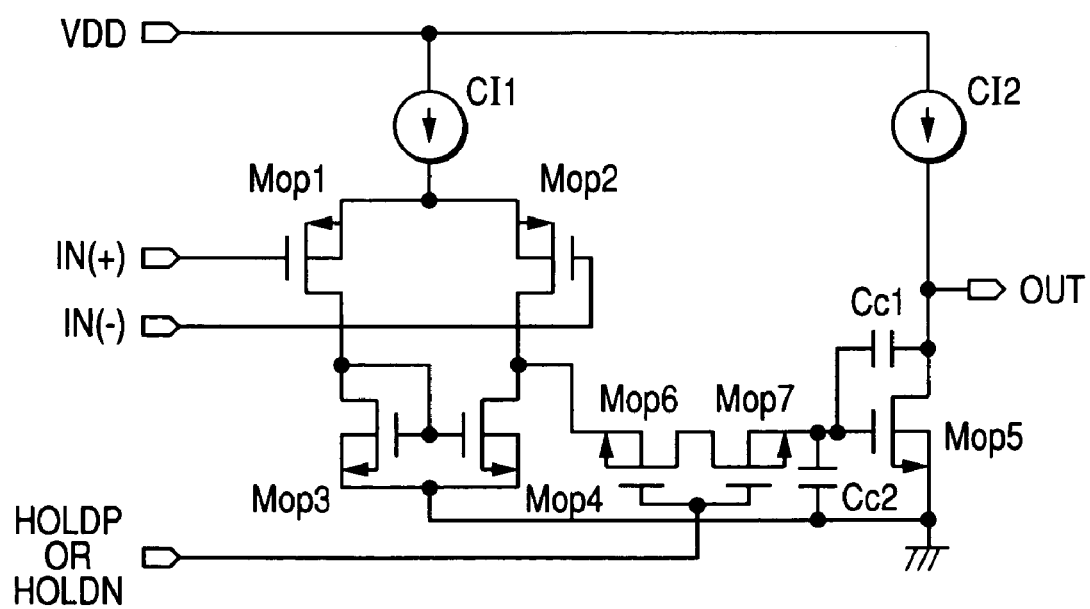
FIG. 19 is a circuit diagram showing a concrete example of an error amplifier with a hold function that is disposed in the current detection circuit.
Figure 20:
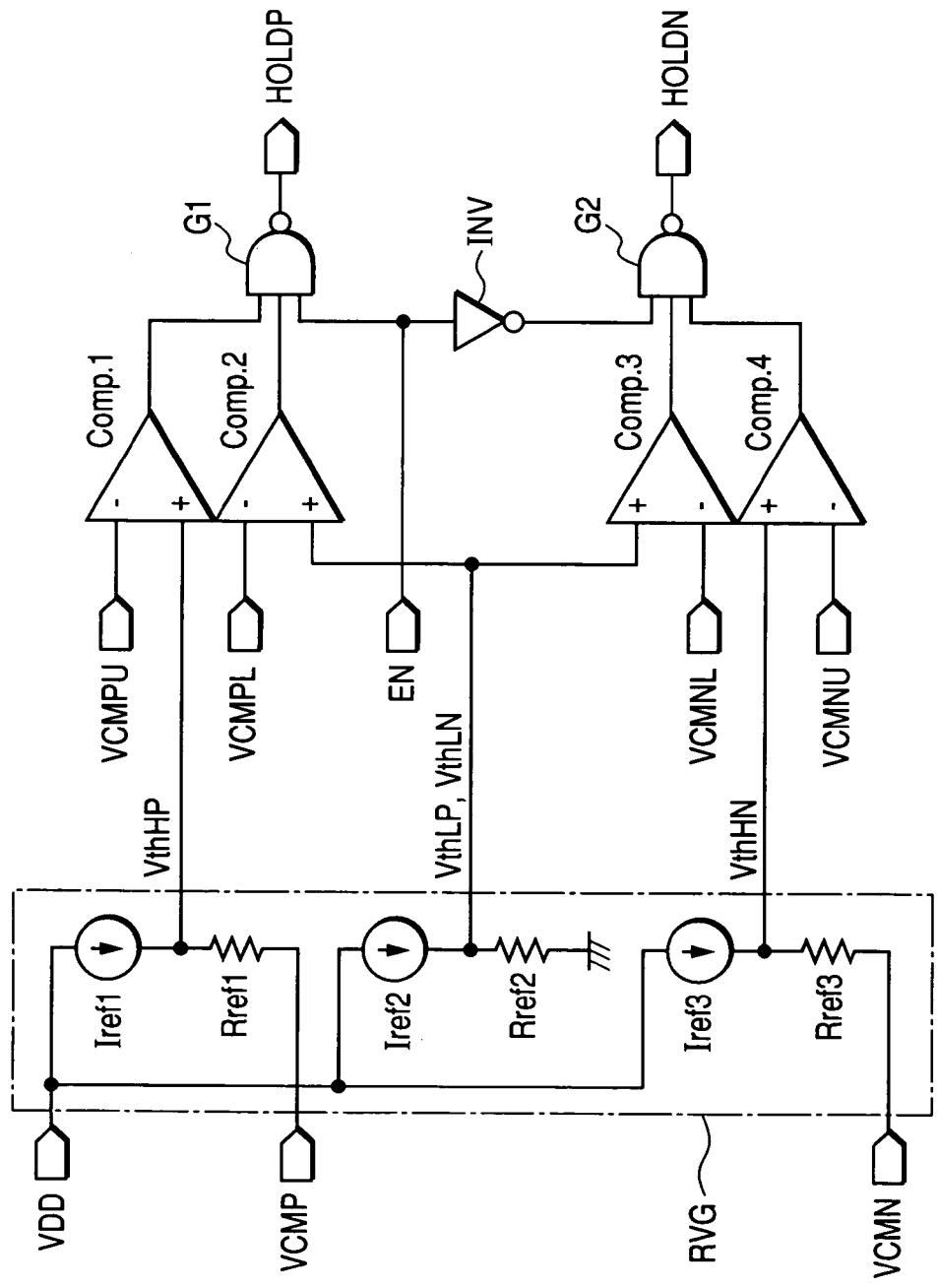
FIG. 20 is a logical structural view showing a concrete example of a dead time judgment circuit.

In this embodiment, each of the error amplifiers AMP11, AMP21, MP 31 and AMP41 is constituted by an error amplifier having a hold function capable of holding an output level in accordance with a control signal HOLDP or HOLDN shown in FIG. 19 and this amplifier is so operated by the control signal HOLDP or HOLDN from a logic circuit shown in FIG. 20 as to hold a detection current value just before for a predetermined period and to avoid the problem described above. The logic circuit (dead time judgment circuit) shown in FIG. 20 can be disposed in the output control circuit 203 shown in FIG. 2.

In the error amplifier shown in FIG. 19, switch MOS transistors Mop6 and Mop7 to the gate terminals of which the control signal HOLDP or HOLDN is inputted are connected in series between a differential amplification stage including a constant current source C11 and MOS transistors Mop1 to Mop4 and an output stage including a constant current C12 and an MOS transistor Mop5. The transistors Mop6 and Mop7 are turned ON and operate as the ordinary error amplifier when the control signal HOLDP or HOLDN is at the high level, but MOS transistor Mop6 and Mop 7 are turned OFF when the control signal HOLDP or HOLDN is at the low level. Because the voltage immediately before is held by the capacitance Cc2 and Cc1, the output voltage OUT can keep the level state immediately before.

The dead time judgment circuit shown in FIG. 20 includes a comparator Comp1 for comparing the control signal VCMPU of the output MOS transistor M11 with a threshold voltage VthHP capable of sufficiently turning ON the transistor M11, a comparator Comp2 for comparing the control signal VCMPL of the output MOS transistor M21 with a threshold voltage VthLP capable of sufficiently turning ON the transistor M21, a comparator Comp3 for comparing the control signal VCMNL of the output MOS transistor M41 with a threshold voltage VthLN capable of sufficiently turning ON the transistor M41, a comparator Comp4 for comparing the control signal VCMNU of the output MOS transistor M31 with a threshold voltage VthHP capable of sufficiently turning ON the transistor M31, a NAND gate G1 for inputting the outputs of the comparators Comp1 and Comp2 and the enable signal EN, and a NAND gate G2 for inputting the outputs of the comparators Comp3 and Comp4 and the inversion signal /EN of the enable signal EN.

When the gate voltages VCMPU and VCMPL of each output MOS transistor M11, M21, M31 and M41 shown in FIG. 16 are lower than the threshold voltages VthHP and VthLP and when VCMNU and VCMNL are lower than VthHN and VthLN, the corresponding output MOS transistor is judged as being OFF and the output of the corresponding comparator rises to the high level. When the enable signals EN of the comparators Comp1 and Comp 2 are all at the high level, the output HOLD of the NAND gate G1 falls to the low level and the amplifiers AMP11 and AMP21 shown in FIG. 16 are under the hold state.

When the comparators Comp3 and Comp4 rise to the high level and the enable signal EN falls to the low level (with/EN being at "H"), the output HOLDN of the NAND gate G2 falls to the low level and the amplifiers AMP31 and AMP41 shown in FIG. 16 enter the hold state. The reference values VthHP and VthLP and the reference values VthLN and VthHN are given by the reference voltage generation circuit RVG disposed inside the output control circuit 203 and including the reference current sources Iref1, Iref2 and Iref3 and the resistors Rref1, Rref2 and Rref3 and the reference voltages VthHP, VthLP (=VthLN) and VthHN which correspond to the gate-source voltage and at which each output transistor can be fully turned ON are decided in advance on the basis of the design values of the threshold voltage of each output transistor, the mutual conductance and the driving current.

Incidentally, it is possible to employ the construction in which a hold circuit for holding the detection current value at a predetermined timing at the post-stage of the current detection amplifier 202 and a judgment circuit for detecting the occurrence of the dead time Tdt in the output control circuit 203 so as to apply the control signal to the hold circuit and to hold the detection current value immediately before the dead time instead of using the construction of the error amplifiers AMP11, AMP21, AMP31 and AMP41 shown in FIG. 19 inside the coil current detection circuit shown in FIG. 15.

Figure 21:
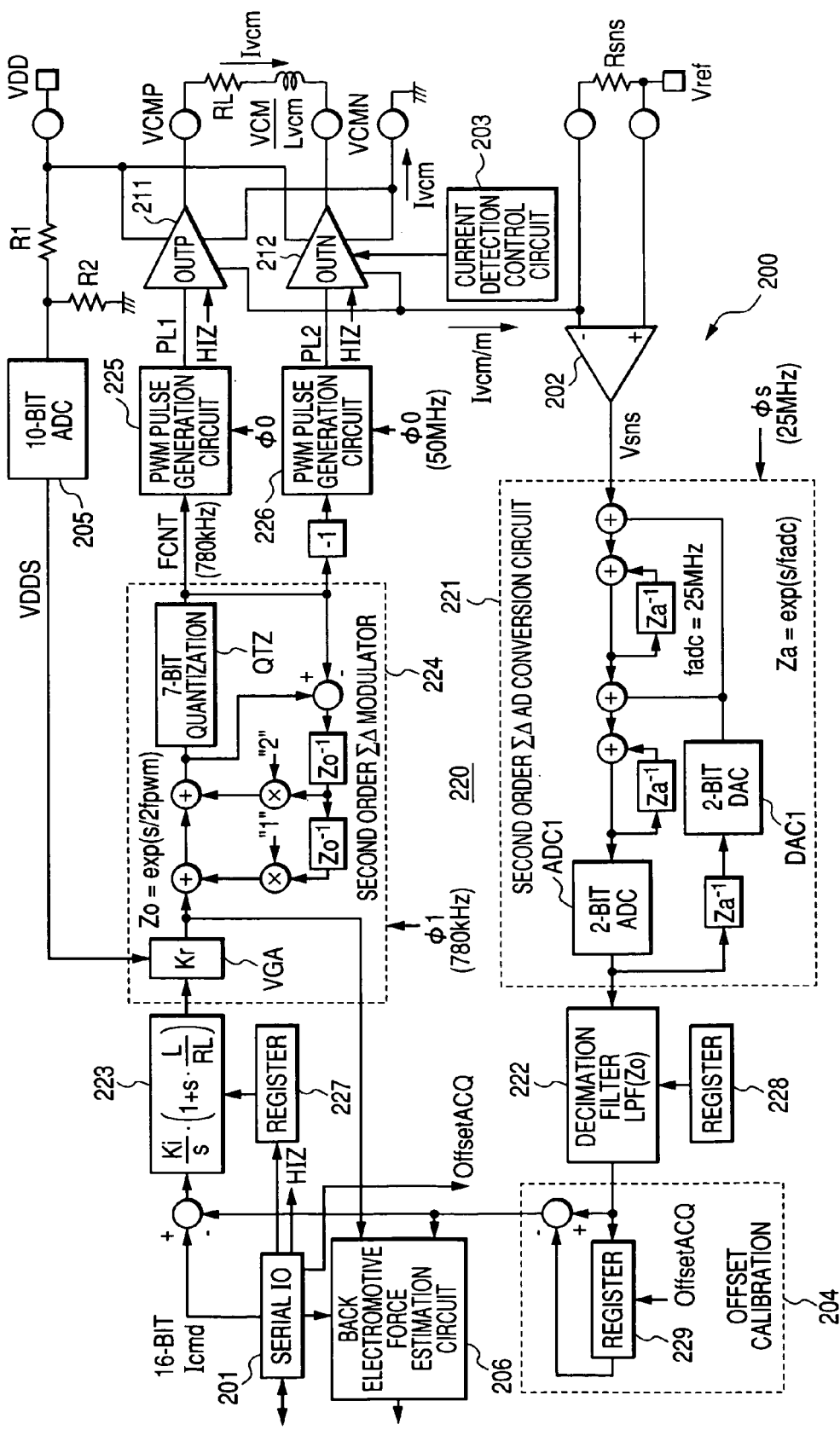
FIG. 21 is a block diagram showing another structural example of the voice coil motor drive circuit constituting the magnetic disk storage apparatus to which the invention is applied.

FIG. 21 shows another structural example of the motor drive circuit 200 for driving and controlling the voice coil motor 108 and FIG. 22 shows its timing chart.

This example uses PAM (pulse amplitude modulation) pulse generation circuits 225 and 226 in place of the PWM pulse generation circuits 225 and 226 in the motor drive circuit of the embodiment shown in FIG. 2. Each PAM pulse generation circuit 225 and 226 can be constituted by an ordinary DA converter. As can be appreciated from FIG. 22 showing the timing of the PAM modulation control in comparison with the timing of the PWM modulation control shown in FIG. 2, the amplitude value is expressed in the PAM modulation control by the designation value designating the pulse width in each ½ cycle in the PWM modulation control. The amplitudes of the driving pulses PL1 and PL2 (pulse width: constant) are changed in accordance with this amplitude designation value and the voltage VCMP-VCMN applied across both terminals of the coil are changed.

Consequently, whereas the pulse duty 25% (amplitude: 100%) is expressed by the designation values +16 and −16 in the PWM modulation control, for example, the pulse amplitude 25% (duty: 100%) is expressed by the designation values +16 and −16 in the PAM modulation control. The advantage that the noise of the frequency component twice the PAM (PWM) frequency appearing in the coil driving current Ivcm can be reduce d by applying the PAM modulation control of this embodiment.

The motor drive circuit according to this embodiment can acquire the semiconductor integrated circuit for driving and controlling the voice coil motor that can conduct the seek operation, the track follow operation and settling operation through the PWM control, has desired control accuracy and can be produced through the CMOS process.

The embodiment can acquire the semiconductor integrated circuit for driving and controlling the voice coil motor that can highly accurately conduct current detection for the feedback control of the voice coil motor without being affected by the jitter of the sampling clock and without depending on the PWM cycle.

Furthermore, the embodiment can constitute the whole control system into a digital circuit while suppressing the quantization noise and can therefore acquire the semiconductor integrated circuit for driving and controlling the voice coil motor that can improve the S/N ratio in comparison with the analog circuits.

The invention can accomplish the magnetic disk storage apparatus requiring small power consumption and having a reduced read error.

The embodiment can further acquire the semiconductor integrated circuit for driving and controlling the voice coil motor that can conduct the seek operation, the track follow operation and the settling operation through the PWM control, can reduce the noise occurring in PWM driving and can conduct high accuracy current control.

The embodiment can further acquire the semiconductor integrated circuit for driving and controlling the voice coil motor that can automatically regulate deviation of the propagation delay time and the transition time occurring in the driver circuit due to variance of production, temperature change and power source voltage fluctuation, can prevent the drop of control accuracy of PWM driving and can prevent the signal read from the head from coupling with the noise due to the change of the output signal of the driver circuit to thereby create the error of the positional information and the memory information.

The embodiment can further acquire the semiconductor integrated circuit for driving and controlling the voice coil motor that can reduce the power loss occurring in the sense resistors.

The embodiment can further acquire the semiconductor integrated circuit for driving and controlling the voice coil motor that can reduce the error current of the coil occurring due to fluctuation of the power source voltage and can conduct high precision driving control.

The invention completed by the present invention has thus been described concretely with reference to the embodiments thereof but the invention can of course be changed or modified in various ways without departing from the scope thereof. For example, in the embodiment described above, PWM driving by the voice coil motor drive circuit is carried out at the times of seek of the magnetic head, track follow and ramp load but PWM driving of the coil may be conducted at the time of unload at which the magnetic head is moved to the ramp by the voice coil motor according to the embodiment. It is further possible to conduct unloading by separately disposing a simple linear drive circuit because control may be relatively rough at the time of unload of the head.

The explanation given above has mainly dealt with the application of the invention to the magnetic disk apparatus using the hard disk as the storage medium as the background and the field of utilization of the invention but the invention is not particularly limited thereto. In other words, the invention can be utilized for positioning control of optical disk pickups, positioning control of printer heads, torque control of industrial AC servo motors, actuator appliances requiring high precision torque control, and so forth.

What is claimed is:

1. A motor drive semiconductor integrated circuit for moving a magnetic head over a magnetic disk for reading information from a storage track on the magnetic disk driven for rotation by conducting feedback control of a driving current flowing through a coil of a voice coil motor while detecting the driving current, wherein a seek operation and a track follow operation of the magnetic head as current control for moving the magnetic head based on a command value from a controller are executed by pulse width modulation (PWM) driving, and wherein a settling operation for shifting the seek operation to the track follow operation and a load operation control for moving the magnetic head from a standby position to over the magnetic disk are executed by PWM driving.

2. A motor drive semiconductor integrated circuit for moving a magnetic head over a magnetic disk for reading information from a storage track on the magnetic disk driven for rotation by conducting feedback control of a driving current flowing through a coil of a voice coil motor while detecting the driving current, wherein a seek operation and a track follow operation of the magnetic head as current control for moving the magnetic head based on a command value from a controller are executed by pulse width modulation (PWM) driving, wherein a control circuit for executing feedback control of the voice coil motor includes a current detection unit for detecting a driving current flowing through a coil of the voice coil motor and a control signal generation unit constituted by a digital circuit for generating a drive control signal for a driver circuit for causing the driving current to flow through the coil of the voice coil motor based on a current detected by the current detection unit and a given current command value, and wherein the control signal generation unit includes a sigma/delta ($\Sigma\Delta$) modulator as a modulation circuit for generating a signal controlling the driver circuit from a difference signal between the current command value and the current detection signal, which includes a phase compensator comprising a digital filter having integration characteristics in a pre-stage of the $\Sigma\Delta$ modulator.

3. A motor drive semiconductor integrated circuit as claimed in claim 2, wherein the phase compensator uses a proportional integral (PI) controller.

4. A motor drive semiconductor integrated circuit as claimed in claim 2, which includes a register for setting a filter coefficient of the phase compensator.

5. A motor drive semiconductor integrated circuit for moving a magnetic head over a magnetic disk for reading information from a storage track on the magnetic disk driven for rotation by conducting feedback control of a driving current flowing through a coil of a voice coil motor while detecting the driving current, wherein a seek operation and a track follow operation of the magnetic head as current control for moving the magnetic head based on a command value from a controller are executed by pulse width modulation (PWM) driving, wherein a control circuit for executing feedback control of the voice coil motor includes a current detection unit for detecting a driving current flowing through a coil of the voice coil motor and a control signal generation unit constituted by a digital circuit for generating a drive control signal for a driver circuit for causing the driving current to flow through the coil of the voice coil motor based on a current detected by the current detection unit and a given current command value, wherein the control signal generation unit includes a sigma/delta ($\Sigma\Delta$) modulator as a modulation circuit for generating a signal controlling the driver circuit from a difference signal between the current command value and the current detection signal, and wherein the current detection unit includes a current detection amplifier and an analog to digital (A/D) conversion circuit for converting the analog signal detected by the amplifier to a digital signal, and the A/D conversion circuit uses an over-sampling type A/D conversion circuit.

6. A motor drive semiconductor integrated circuit as claimed in claim 5, wherein the A/D conversion circuit uses a $\Sigma\Delta$ modulation type A/D conversion circuit.

7. A motor drive semiconductor integrated circuit as claimed in claim 6, which includes a decimation filter having low-pass and frequency thin-out functions in a post-stage of the $\Sigma\Delta$ modulation type A/D conversion circuit.

8. A motor drive semiconductor integrated circuit as claimed in claim 7, wherein the decimation circuit has a phase lead compensator.

9. A motor drive semiconductor integrated circuit for moving a magnetic head over a magnetic disk for reading information from a storage track on the magnetic disk driven for rotation by conducting feedback control of a driving current flowing through a coil of a voice coil motor while detecting the driving current, wherein a control circuit for executing feedback control of the voice coil motor is constituted by a digital circuit, a sigma/delta ($\Sigma\Delta$) modulator is used as a modulation circuit for generating a signal for controlling an output driver based on an output signal of a phase compensator generated from a difference signal between a given current command value and a current detection value, and the semiconductor integrated circuit further includes a back electromotive force estimation circuit for estimating a back electromotive force occurring in the coil based on an output of the current detection unit and a driving voltage command signal as an input of the $\Sigma\Delta$ modulator.

10. A motor drive semiconductor integrated circuit a motor as claimed in claim 9, wherein the control circuit includes a current detection unit for detecting a driving current flowing through a coil of the voice coil motor and a control signal generation unit for generating a drive control signal for a driver circuit for causing the driving current to flow through the coil of the voice coil motor based on a current detected by the current detection unit and the current command value, and the control signal generation unit includes a $\Sigma\Delta$ modulator for generating a signal controlling the driver circuit from a difference signal between the current command value and the current detection signal, a phase compensator comprising a digital filter disposed in a pre-stage of the $\Sigma\Delta$ modulator and having integration characteristics and a digital to analog (D Applicants) conversion circuit for converting the signal modulated by the $\Sigma\Delta$ modulator to an analog signal, and the current detection unit includes a $\Sigma\Delta$ modulation type analog to digital (A/D) conversion circuit for converting the analog signal detected by a current detection amplifier to a digital signal and a decimation filter having low-pass and frequency thin-out functions in a post-stage of the $\Sigma\Delta$ modulation type A/D conversion circuit.

11. A motor drive semiconductor integrated circuit as claimed in claim 9, which includes a driver circuit for causing a driving current to flow through the coil of the voice coil motor in accordance with a signal generated by the control circuit.

12. A motor drive semiconductor integrated circuit as claimed in claim 10, wherein the decimation filter has a phase lead compensator.

13. A motor drive semiconductor integrated circuit for use in a motor driven by supplying a current to a coil in an H bridge type, for driving and controlling an output stage for supplying the current supplied to the coil, wherein a control circuit for executing feedback control of the motor includes a current detection unit for detecting a driving current flowing through the coil of the motor and a control signal generation unit having a sigma/delta ($\Sigma\Delta$) modulator as a modulation circuit for generating a signal for controlling a driver circuit driving and controlling the output stage for causing the driving current to flow through the coil of the motor from a difference signal between a current detection value detected by the current detection unit and a given current command value, which includes a phase compensator comprising a digital filter having integration characteristics disposed in a pre-stage of the $\Sigma\Delta$ modulator.

14. A motor drive semiconductor integrated circuit as claimed in claim 13, wherein a proportional integral (PI) controller is used as the phase compensator.

15. A motor drive semiconductor integrated circuit as claimed in claim 13, which includes a register for setting a filter coefficient of the phase compensator.

16. A motor drive semiconductor integrated circuit for use in a motor driven by supplying a current to a coil in an H-bridge type, for driving and controlling an output stage for supplying the current supplied to the coil,
   wherein a control circuit for executing feedback control of the motor includes a current detection unit for detecting a driving current flowing through the coil of the motor and a control signal generation unit having a sigma/delta ($\Sigma\Delta$) modulator as a modulation circuit for generating a signal for controlling a driver circuit driving and controlling the output stage for causing the driving current to flow through the coil of the motor from a difference signal between a current detection value detected by the current detection unit and a given current command value, and
   wherein the current detection unit includes a current detection amplifier and an analog to digital (A/D) conversion circuit for converting an analog signal detected by the amplifier to a digital signal, and an over-sampling type A/D conversion circuit is used as the A/D conversion circuit.

17. A motor drive semiconductor integrated circuit as claimed in claim 16, wherein the A/D conversion circuit uses a $\Sigma\Delta$ modulation type A/D conversion circuit.

18. A motor drive semiconductor integrated circuit as claimed in claim 17, which includes a decimation filter having low-pass and frequency thin-out functions in a post stage of the $\Sigma\Delta$ modulation type A/D conversion circuit.

19. A motor drive semiconductor integrated circuit as claimed in claim 18, wherein the decimation filter has a phase lead compensator.

20. A motor drive semiconductor integrated circuit for use in a motor driven by supplying a current to a coil in an H-bridge type, for driving and controlling an output stage for supplying the current supplied to the coil, wherein a control circuit for executing feedback control of the motor includes a current detection unit for detecting a driving current flowing through the coil of the motor and a control signal generation unit having a sigma/delta ($\Sigma\Delta$) modulator as a modulation circuit for generating a signal for controlling a driver circuit driving and controlling the output stage for causing the driving current to flow through the coil of the motor from a difference signal between a current detection value detected by the current detection unit and a given current command value, and
   wherein the control signal generation unit has a back electromotive force estimation circuit for estimating a back electromotive force occurring in the coil on the basis of an output of the current detection unit and a driving voltage command signal as an input of the $\Sigma\Delta$ modulator.

* * * * *